(12) United States Patent
Marques et al.

(10) Patent No.: US 10,550,760 B2
(45) Date of Patent: Feb. 4, 2020

(54) LOADED TURBOCHARGER TURBINE WASTEGATE CONTROL LINKAGE JOINTS

(71) Applicant: Garrett Transportation I Inc., Torrance, CA (US)

(72) Inventors: Manuel Marques, Richardmenil (FR); Manuel Gonzalez, Maule (FR)

(73) Assignee: Garrett Transportation I Inc., Torrance, CA (US)

(*) Notice: Subject to any disclaimer, the term of this patent is extended or adjusted under 35 U.S.C. 154(b) by 611 days.

(21) Appl. No.: 15/220,514

(22) Filed: Jul. 27, 2016

(65) Prior Publication Data

US 2017/0058762 A1 Mar. 2, 2017

Related U.S. Application Data

(60) Provisional application No. 62/210,368, filed on Aug. 26, 2015.

(51) Int. Cl.
| | | |
|---|---|---|
| F02B 37/18 | (2006.01) | |
| F01D 17/10 | (2006.01) | |
| F01D 17/14 | (2006.01) | |
| F01D 25/24 | (2006.01) | |

(52) U.S. Cl.
CPC .......... *F02B 37/186* (2013.01); *F01D 17/105* (2013.01); *F01D 17/141* (2013.01); *F01D 25/24* (2013.01); *F05D 2220/40* (2013.01); *F05D 2260/52* (2013.01); *F05D 2260/57* (2013.01)

(58) Field of Classification Search
CPC ...... F03B 37/18; F03B 37/183; F03B 37/186; F05D 2260/52
See application file for complete search history.

(56) References Cited

U.S. PATENT DOCUMENTS

| | | | |
|---|---|---|---|
| 4,815,184 A | 3/1989 | Johnston et al. | |
| 9,243,549 B2 * | 1/2016 | Hinkelmann | F01D 17/105 |
| 2006/0213195 A1 * | 9/2006 | Leavesley | F02B 37/18 |
| | | | 60/605.1 |
| 2014/0072411 A1 * | 3/2014 | Marques | F01D 17/105 |
| | | | 415/144 |

(Continued)

FOREIGN PATENT DOCUMENTS

| | | | |
|---|---|---|---|
| CN | 204921150 | * 12/2015 | F02B 39/00 |
| DE | 103 25 980 A1 | 12/2004 | |

(Continued)

OTHER PUBLICATIONS

FR 3013384 to Dessarthe (May 2015).*
EPO Application No. 16185211.6-1616, Extended European Search Report, dated Feb. 3, 2017 (14 pages).

*Primary Examiner* — Jason D Shanske
*Assistant Examiner* — Jessica L Kebea
(74) *Attorney, Agent, or Firm* — Brian J. Pangrle

(57) ABSTRACT

An assembly can include a turbine housing that includes a bore, a wastegate seat and a wastegate passage that extends to the wastegate seat; a bushing disposed at least in part in the bore; a rotatable wastegate shaft received at least in part by the bushing; a wastegate plug that extends from the wastegate shaft; a control arm operatively coupled to the wastegate shaft; a control link operatively coupled to the control arm; a pin that forms a joint between the control arm and the control link; and a biasing element coupled to the pin and to the control link.

18 Claims, 22 Drawing Sheets

(56) References Cited

U.S. PATENT DOCUMENTS

2017/0328491 A1* 11/2017 Malik .................... F16H 21/44
2018/0320582 A1* 11/2018 Folk ..................... F02B 37/186

FOREIGN PATENT DOCUMENTS

| | | | |
|---|---|---|---|
| DE | 10 2007 018 618 A1 | 10/2007 | |
| DE | 202007019447 U1 * | 8/2012 | ............. F16F 7/116 |
| DE | 20 2007 019 447 U1 | 10/2012 | |
| DE | 102011007417 A1 * | 10/2012 | ........... F01D 17/165 |
| DE | 102012012160 A1 * | 1/2014 | ............. F02B 37/12 |
| DE | 10 2013 207 677 A1 | 10/2014 | |
| FR | 3 013 384 A1 | 5/2015 | |
| WO | 2012/079664 A1 | 6/2012 | |
| WO | 2013/015985 A1 | 1/2013 | |
| WO | 2013/087182 A2 | 6/2013 | |
| WO | 2015/075331 A1 | 5/2015 | |

\* cited by examiner

LOADED TURBOCHARGER TURBINE WASTEGATE CONTROL LINKAGE JOINTS

RELATED APPLICATION

This application claims priority to and the benefit of a U.S. Provisional Application having Ser. No. 62/210,368, filed 26 Aug. 2015. This application incorporates by reference herein a U.S. patent application Ser. No. 14/194,909, filed 3 Mar. 2014, incorporates by reference herein a U.S. patent application Ser. No. 14/194,913, filed 3 Mar. 2014, and incorporates by reference herein a U.S. Provisional Patent Application Ser. No. 62/207,430, filed 20 Aug. 2015.

TECHNICAL FIELD

Subject matter disclosed herein relates generally to turbomachinery for internal combustion engines and, in particular, to turbine wastegates, wastegate control, etc.

BACKGROUND

A turbine wastegate is typically a valve (e.g., a wastegate or wastegate valve) that can be controlled to selectively allow at least some exhaust to bypass a turbine. Where an exhaust gas of an internal combustion engine drives a turbine that can drive a compressor for boosting inlet pressure to an internal combustion engine (e.g., as in a turbocharger), a wastegate provides a means to control the boost pressure (e.g., by wastegating at least a portion of the exhaust gas).

A so-called internal wastegate can be characterized as being integrated at least partially into a turbine housing. An internal wastegate typically includes a flapper valve (e.g., a plug or poppet), a crank arm, a shaft or rod, and an actuator that can be coupled to a control linkage that is coupled to the crank arm, which may be considered a part of the control linkage. A plug of a wastegate often includes a flat disk shaped surface that seats against a flat seat (e.g., a valve seat or wastegate seat) disposed about an exhaust bypass opening, though various plugs may include a protruding portion that extends into an exhaust bypass opening (e.g., past a plane of a wastegate seat).

Wastegate components for various internal combustion engine applications may be of particular concern where operational temperatures and/or exhaust pulsation levels can be considerable. For example, noise may be generated responsive to exhaust pulsation and/or other vibration associated with operation of an internal combustion engine and/or a vehicle. Various examples of wastegates and wastegate related components, as are described herein, may provide for reduction in noise, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
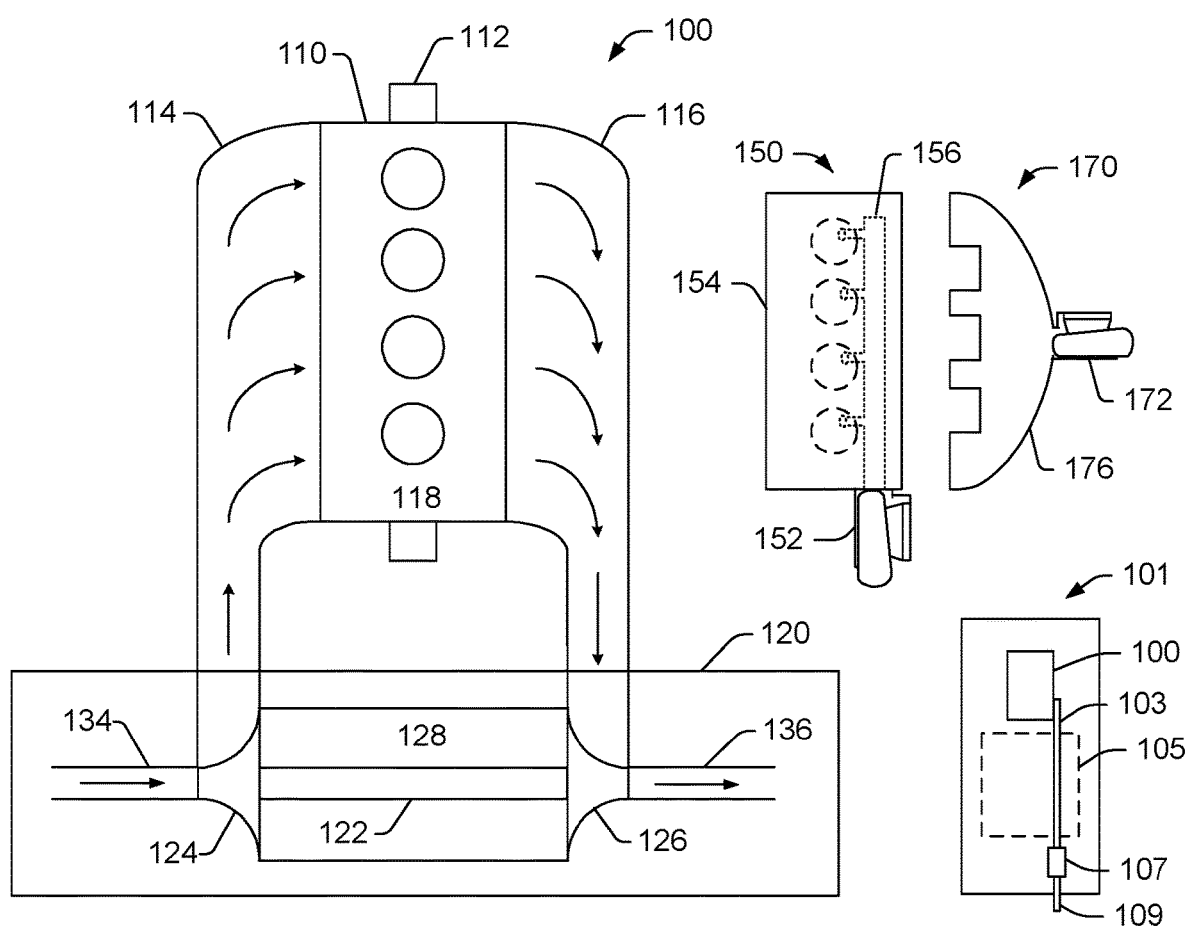
FIG. 1 is a diagram of a turbocharger and an internal combustion engine along with a controller.
Figure 1:
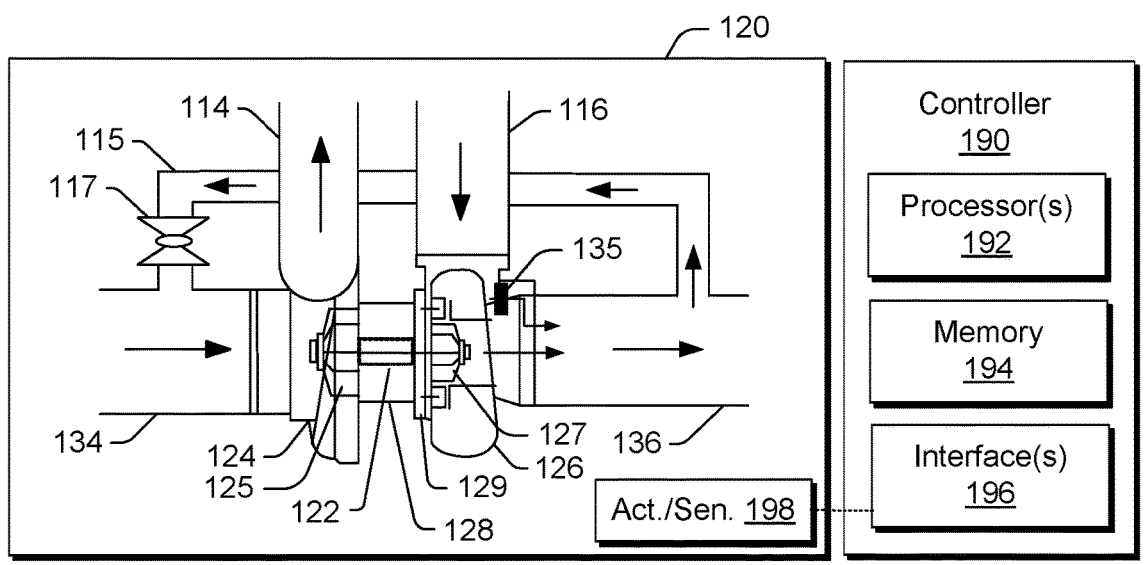

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU), engine management unit (EMU), etc. As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation (e.g., optionally via turbocharger control).

The controller 190 may include circuitry for control of one or more of lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator that can respond to receipt of an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit). As an example, an actuator for a wastegate may be an electric actuator. As an example, an actuator for a wastegate may be a rotary electric actuator (REA) that includes an electric motor that can rotate a shaft to, for example, move a control linkage operatively coupled to a wastegate.

Figure 2:
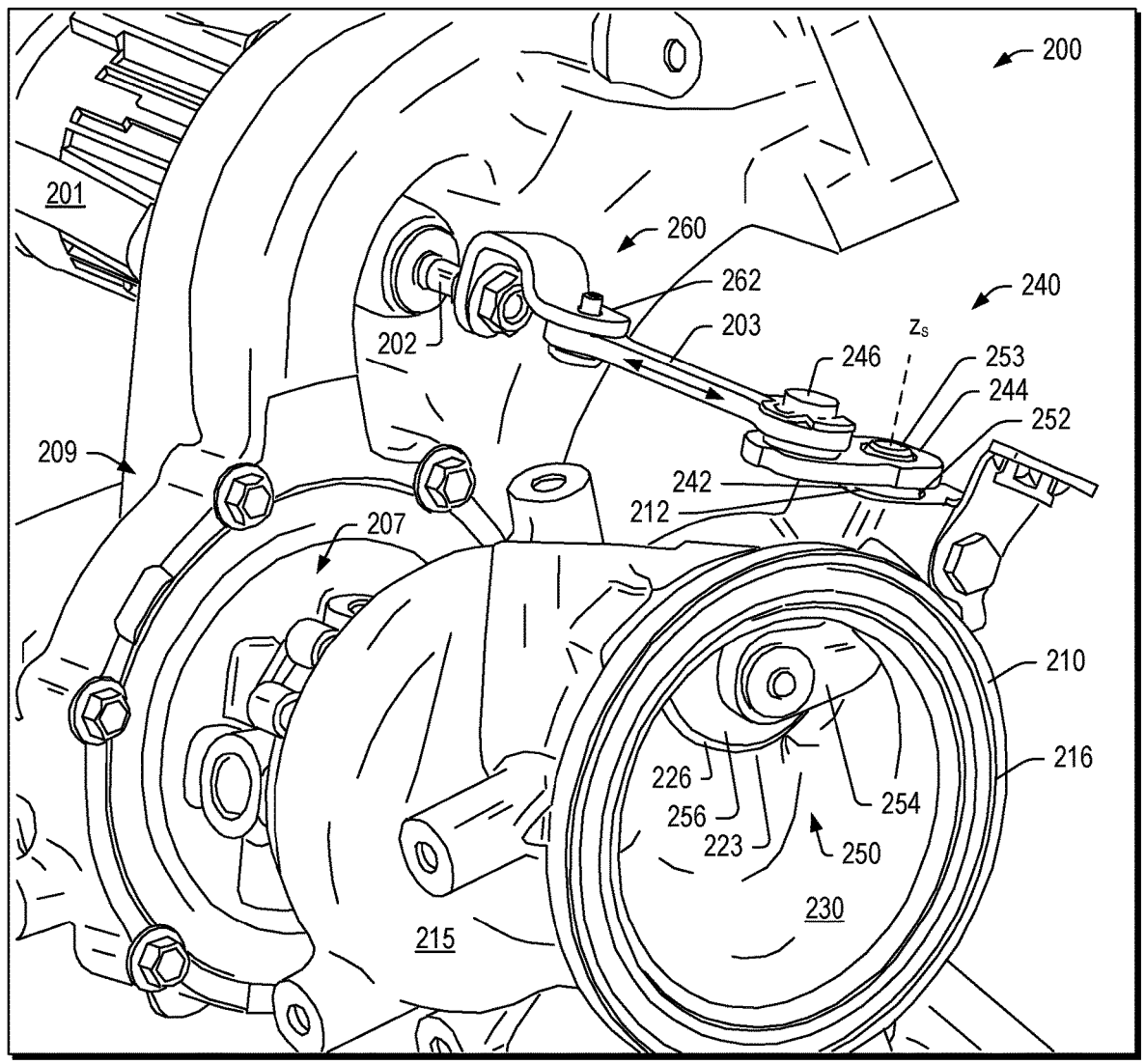
FIG. 2 is a series of view of an example of an assembly that includes a wastegate.

FIG. 2 shows an example of an assembly 200 that includes an actuator 201, an actuation rod 202, an actuator link 203, a center housing 207 (e.g., to house a bearing, bearings, etc. for a turbocharger shaft, etc.), a compressor housing 209, a turbine housing 210 that includes a bore 212, a spiral wall 215 (e.g., that defines, in part, a volute), an exhaust gas outlet opening 216, a wastegate wall 223 that extends to a wastegate seat 226, and an exhaust chamber 230.

In the example of FIG. 2, the turbine housing 210 may be a single piece or multi-piece housing. As an example, the turbine housing 210 may be a cast component (e.g., formed via sand casting or other casting process). As shown, the turbine housing 210 includes various walls, which can define features such as the bore 212, a turbine wheel opening, the gas exhaust outlet opening 216, the chamber 230, etc. In particular, the wastegate wall 223 defines a wastegate passage in fluid communication with an inlet conduit where a portion of a wastegate control linkage 240 and a wastegate arm and plug 250 are configured for opening and closing the wastegate passage (e.g., for wastegating exhaust). Another portion of the wastegate control linkage 260 is operatively coupled to the actuator 201, for example, via a coupling 262 that couples the actuator link 203 to the actuation rod 202 (e.g., a linear or axially translating actuation rod).

In the example of FIG. 2, the portion of the wastegate control linkage 240 includes a bushing 242 that is dimensioned for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, in an effort to seal the chamber 230 from an exterior space, etc. (e.g., to reduce leakage of exhaust gas). The bore 212, the bushing 242 and the shaft 252 may each be defined by a diameter or diameters as well as one or more lengths (e.g., axial lengths).

As an example, the assembly 200 may be fitted to an exhaust gas conduit or other component of an internal combustion engine (see, e.g., examples of FIG. 1), for example, via a flange such that exhaust is received via an inlet conduit that may direct exhaust to a volute (e.g., or volutes) that may be defined at least in part by the spiral wall 215. As an example, a volute (e.g., or volutes) may direct exhaust gas (e.g., via a nozzle or nozzles) to a turbine wheel disposed in the turbine housing 210 where the exhaust gas may flow and expand in a turbine wheel space defined in part by the turbine housing 210. Exhaust gas may then exit the turbine wheel space by flowing to the chamber 230 and then out of the turbine housing 210 via the exhaust gas outlet opening 216.

As to wastegating, upon actuation of the control linkage 240 (e.g., by the actuator link 203 being operatively coupled to the peg 246), the wastegate arm and plug 250 may be rotated such that at least a portion of the received exhaust can flow in the wastegate passage defined by the wastegate wall 223, past the wastegate seat 226 and into the chamber 230, rather than through a nozzle to a turbine wheel space. The wastegated portion of the exhaust may then exit the turbine housing 210 via the exhaust gas outlet opening 216 (e.g., and pass to an exhaust system of a vehicle, be recirculated in part, etc.).

As an example, the portion of the control linkage 240 may exert a force that acts to force the plug 256 in a direction toward the wastegate seat 226. For example, the actuator 201 may include a biasing mechanism (e.g., a spring, etc.) that exerts force, which may be controllably overcome, at least in part, for rotating the plug 256 away from the wastegate seat 226 (e.g., for wastegating). As an example, the actuator 201 may be mounted to the assembly 200. As an example, the actuator 201 may be a linear actuator, for example, for moving the actuation rod 202 along an axis. Depending on orientation of a plug, a shaft, a control linkage and such a rod, to maintain the plug in a closed position, the rod may exert a downward force (e.g., away from the control linkage as in the example of FIG. 2) or the rod may exert an upward force (e.g., toward the control linkage). For example, where the control arm 244 (e.g., and the peg 246) of the portion of the control linkage 240 are oriented on the same "side" as the plug 256 with respect to the shaft 252, a downward force applied to the control arm 244 (e.g., via the peg 246) may act to maintain the plug 256 in a closed position with respect to the wastegate seat 226; whereas, where, for example, an approximately 180 degree span exists between a plug and a control arm, an upward force applied to the control arm may act to maintain the plug in a closed position with respect to a wastegate seat.

As an example, where a rotary actuator is implemented in an assembly, rotation of a rotational peg (e.g., shaft, pin, etc.) may be in a clockwise or in a counter-clockwise direction to cause a plug of a wastegate to open or close or close or open with respect to a wastegate seat (e.g., depending on orientation of components).

As an example, the actuation rod 202 of the actuator 201 may be biased to exert a force on the portion of the control linkage 240 that causes the portion of the control linkage 240 to exert a force on the plug 256 such that the plug 256 seats against the wastegate seat 226. In such an example, the actuator 201 may at least in part overcome the force that biases the actuation rod 202 such that the shaft 252 rotates the plug 256 away from the wastegate seat. For example, in FIG. 2, to initiate wastegating, the entire plug 256 rotates about an axis of the shaft 252 and moves away from the wastegate seat 226 (e.g., without any portion of the plug 256 moving in a direction into a wastegate opening defined by the wastegate seat 226). As an example, the moving away of the plug 256 may be facilitated by exhaust pressure. For example, in a closed position, the plug 256 experiences a pressure differential where pressure is higher below the plug 256 and less above the plug 256. In such an example, the pressure below the plug 256 acts in a direction that is countered by the closing force applied to the plug 256 via the portion of the control linkage 240 (e.g., the pressure differential acts to bias the plug 256 toward an open position). Accordingly, the closing force applied to the plug 256 should overcome pressure force from below the plug 256. Further, where the shaft 252 may include some play (e.g., axial play, etc.), the closing force applied to the plug 256 may cause the plug 256 to move with respect to the wastegate seat 226.

In the example of FIG. 2, the axes of the bore 212, the bushing 242 and the shaft 252 may be aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it may be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

In the example of FIG. 2, the actuator 201 is mounted at a distance from the turbine housing 210, which can, for example, reduce actuator exposure to heat energy of exhaust gas that flows to and through the turbine housing 210. However, as shown, the control arm 244 attached to the shaft 252 and therefore may be heated at least in part via conduction of heat energy from the shaft 252 where at least a portion of the shaft 252 is exposed directly to exhaust gas (e.g., in the chamber 230, in the bore 212, etc.). Further, a conduction path for heat energy may exist from the plug 256 via the arm 254 to the shaft 252. In the example of FIG. 2, during operation of the assembly 200, the portion of the control linkage 240 can be exposed to heat energy that is greater than the level of heat energy to which the actuator 201 may be exposed and greater than the level of heat energy to which the portion of the control linkage 260 is exposed. In such an example, issues as to thermal expansion/contraction, wear, noise, etc., may be more prominent at the portion of the control linkage 240 (e.g., a "hot" portion) when compared to the portion of the control linkage 260 (e.g., a "cold" portion).

Figure 3:
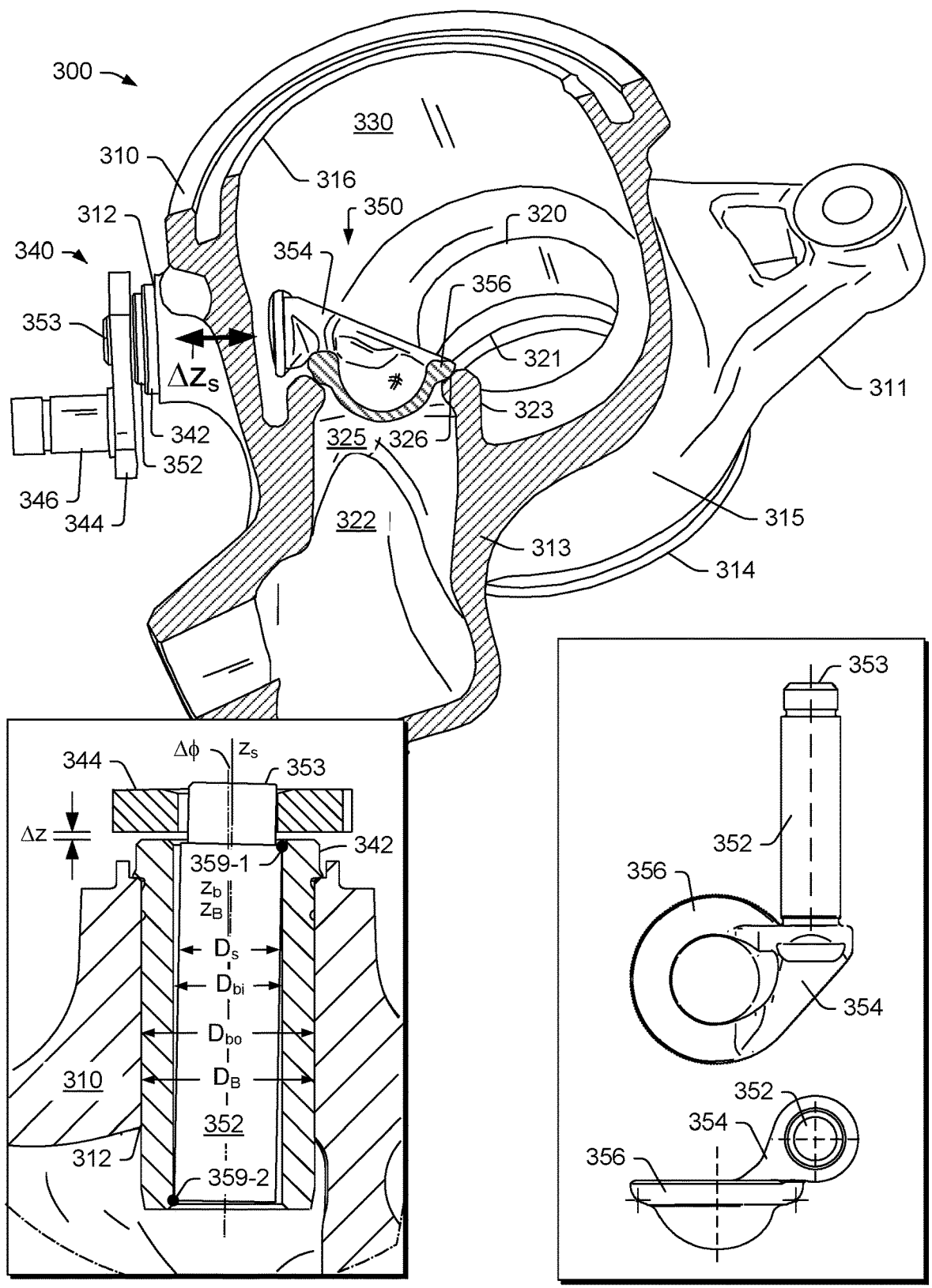
FIG. 3 is a cutaway view of an example of an assembly that includes a wastegate.

FIG. 3 shows an example of an assembly 300 that includes a wastegate arm and plug 350 that differs from the wastegate arm and plug 250 of the assembly 200 of FIG. 2. In particular, the wastegate arm and plug 350 includes a plug 356 that includes a substantially hemispherical shell portion. As an example, the wastegate arm and plug 350 may be a unitary component (e.g., optionally unitary with the shaft 352).

In the example of FIG. 3 the assembly 300 includes a turbine housing 310 that includes a mounting flange 311, a bore 312, an inlet conduit 313, a turbine wheel opening 314 (e.g., for receipt of at least a portion of a turbine wheel), a spiral wall 315, an exhaust gas outlet opening 316, a shroud wall 320, a nozzle 321, a volute 322 formed in part by the spiral wall 315, a wastegate wall 323 that defines (e.g., at least in part) a wastegate passage 325 where the wastegate wall 323 extends to a wastegate seat 326 that may be an interface between the wastegate passage 325 and an exhaust chamber 330.

In the example of FIG. 3, the turbine housing 310 may be a single piece or multi-piece housing. As an example, the turbine housing 310 may be a cast component (e.g., formed via sand casting or other casting process). The turbine housing 310 includes various walls, which can define features such as the bore 312, the turbine wheel opening 314, the exhaust gas outlet opening 316, the chamber 330, etc. In particular, the wastegate wall 323 defines at least in part the wastegate passage 325, which is in fluid communication with the inlet conduit 313 where a wastegate control linkage 340 and the wastegate arm and plug 350 are configured for opening and closing the wastegate passage (e.g., for wastegating exhaust gas and for not wastegating exhaust gas).

In the example of FIG. 3, the wastegate control linkage 340 includes a bushing 342 configured for receipt by the bore 312 of the turbine housing 310, a control arm 344 and a peg 346 and the wastegate arm and plug 350 includes a shaft 352, a shaft end 353, an arm 354 and the plug 356. As shown, the bushing 342 is disposed between the bore 312 and the shaft 352, for example, to support rotation of the shaft 352, to act to seal the chamber 330 from an exterior space, etc. The bore 312, the bushing 342 and the shaft 352 may each be defined by a diameter or diameters as well as one or more lengths. For example, the shaft 352 includes a diameter $D_s$, the bore 312 includes a diameter $D_B$ while the bushing 342 includes an inner diameter $D_{bi}$; and an outer diameter $D_{bo}$. In the example of FIG. 3, when the various components are assembled, as to such diameters: $D_B > D_{bo} > D_{bi} > D_s$. As to lengths, a length of the shaft 352 exceeds a length of the bushing 342, which exceeds a length of the bore 312. Such lengths may be defined with respect to a shaft axis $z_s$, a bushing axis $z_b$ and a bore axis $z_B$. As shown, the bushing 342 is disposed axially between a shoulder of the shaft 352 (e.g., a face of the arm 354 where the arm 354 and the shaft 352 meet) and the control arm 344 of the control linkage 340.

In the example of FIG. 3, a gap Δz is shown between a surface of the bushing 342 and a surface of the control arm 344, which allows for axial movement of the shaft 352, for example, to facilitate self-centering of the plug 356 with respect to the wastegate seat 326. For example, the plug 356 may include shape that acts to self-center with respect to a shape of the wastegate seat 326. As an example, the plug 356 may include a toroidal portion and the wastegate seat 326 may include a conical surface such that the plug 356 may self-center with respect to the wastegate seat 326. Self-centering may be facilitated by application of force that acts to maintain the plug 356 in a closed position with respect to the wastegate seat 326.

As an example, the assembly 300 may be fitted to an exhaust gas conduit or other component of an internal combustion engine (see, e.g., examples of FIG. 1), for example, via a flange (see, e.g., the flange 211 of FIG. 2) such that exhaust is received via the inlet conduit 313, directed to the volute 322. From the volute 322, exhaust gas is directed via the nozzle 321 to a turbine wheel disposed in the turbine housing 310 via the opening 314 to flow and expand in a turbine wheel space defined in part by the shroud wall 320. Exhaust gas can then exit the turbine wheel space by flowing to the chamber 330 and then out of the turbine housing 310 via the exhaust gas outlet opening 316. As to wastegating, upon actuation of the control linkage 340 (e.g., by an actuator coupled to the peg 346), the wastegate arm and plug 350 may be rotated such that at least a portion of the received exhaust gas can flow in the wastegate passage 325 (e.g., as defined at least in part by the wastegate wall 323), past the wastegate seat 326 and into the chamber 330, rather than through the nozzle 321 to the turbine wheel space. The wastegated portion of the exhaust gas may then exit the turbine housing 310 via the exhaust gas outlet opening 316 (e.g., and pass to an exhaust gas system of a vehicle, be recirculated in part, etc.).

In the example of FIG. 3, the axes of the bore 312, the bushing 342 and the shaft 352 may be aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

As mentioned, the wastegate arm and plug 350 differs from the wastegate arm and plug 250. In particular, the plug 356 differs from the plug 256. Further, the shape of the arm 354 differs from the shape of the arm 254. In an assembly such as the assembly 200 or the assembly 300, due to one or more factors, the wastegate arm and plug 350 may enhance performance, controllability, longevity, etc. when compared to the wastegate arm and plug 250.

As mentioned, as an example, the wastegate arm and plug 350 may be a unitary wastegate arm and plug (e.g., a monoblock wastegate arm and plug) or a wastegate arm and plug assembly.

As an example, the wastegate arm and plug 350 may have a lesser mass than the wastegate arm and plug 250 and, for example, a center of mass for the wastegate arm and plug 350 may differ compared to a center of mass for the wastegate arm and plug 250. As an example, due to the shape of the plug 356, it may perform aerodynamically in a more beneficial manner than the plug 256. For example, the plug 356 may, due to its shape, act to maintain its center more effectively than the plug 256. As an example, the wastegate arm and plug 350 may provide benefits as to controllability, for example, due to centering, reduced chatter, aerodynamics, etc. As an example, such benefits may improve performance, longevity, etc. of an actuator that is operatively coupled to the wastegate arm and plug 350 (e.g., for transitioning states, maintaining a state, etc.). As an example, such benefits may improve performance, longevity, etc. of a seal mechanism (e.g., bushing, bushings, etc.) for the shaft 352 of the wastegate arm and plug 350 (e.g., with respect to a bore).

As mentioned, an assembly may include a gap such as the axial gap Δz that may facilitate, for example, self-centering of a plug with respect to a wastegate seat. However, where the plug is in an open position, the gap may possibly allow for movement of the plug, for example, due to forces from exhaust gas flowing past the plug. Where exhaust gas is pulsating, such forces may possibly cause rattling and noise. For example, forces may cause a shaft to move axially with respect to a bore, a bushing, etc. (e.g., separate components), optionally in a back and forth manner (e.g., consider vibration) that may cause periodic contacting between components that may be detrimental.

Figure 4:
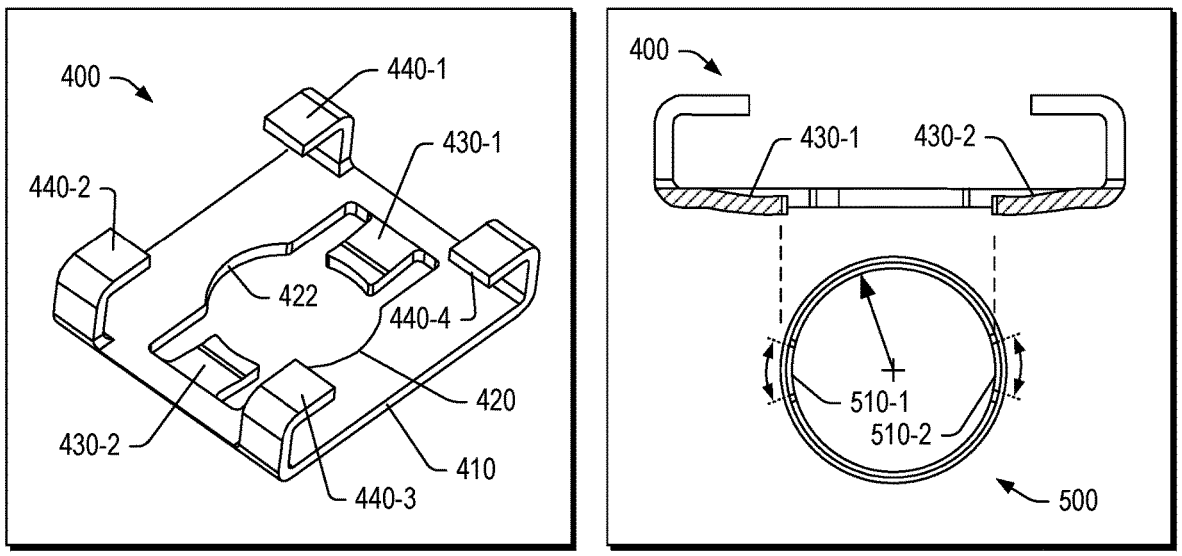
FIG. 4 is a series of views of an example of a biasing member, examples of assemblies that include a biasing member and an example of an assembly with respect to disengaged and engaged orientations of a biasing member.
Figure 4:
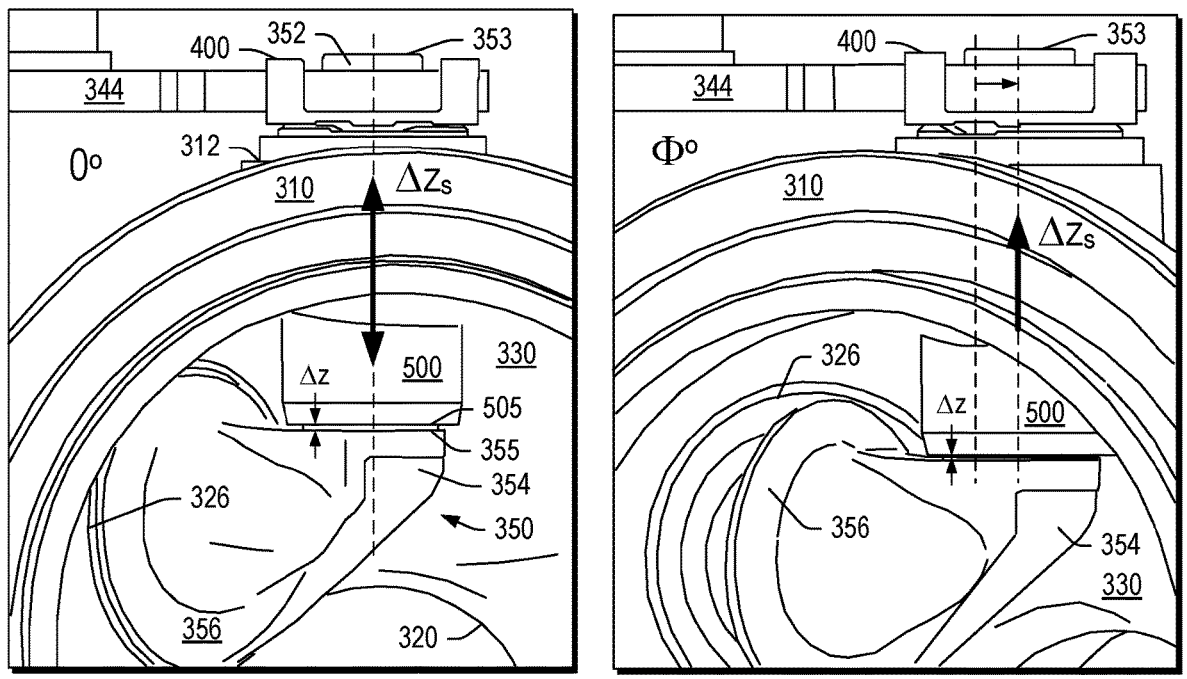

FIG. 4 shows an example of a biasing cam 400 that may be operatively coupled to a portion of a control linkage for a wastegate plug. For example, the biasing cam 400 may be operatively coupled to the control arm 344 of the control linkage 340 of FIG. 3. In such an example, the biasing cam 400 may act to reduce risk of rattling and associated noise, for example, by applying a biasing force that biases the shaft 352 (e.g., axially biasing the shaft) when the plug 356 is in an open position. The biasing cam 400 may also, for example, allow for an amount of axial play when the plug 356 is in a closed position, for example, to allow for movement of the plug 356 (e.g., at least axially) with respect to the wastegate seat 326 (e.g., for self-centering, etc.).

In the example of FIG. 4, the biasing cam 400 may include a base 410 with an opening 420 defined in part by a surface, biasing members 430-1 and 430-2 and coupling members 440-1, 440-2, 440-3 and 440-4. As an example, the base 410 may be planar (e.g., see x and y dimensions) and include sides. As an example, the opening 420 may be defined in part by a dimension such as a radius (r) with respect to an axis ($z_s$). As an example, the base 410 may be defined in part by a thickness or thickness (e.g., see z dimension).

As an example, the biasing cam 400 may be formed from a unitary piece of material. For example, a piece of sheet metal may be stamped and formed to a shape of a biasing cam, for example, such as the biasing cam 400 shown in the example of FIG. 4. As an example, a biasing cam may be a multi-piece component that may include, for example, a base and one or more biasing components or members such as one or more springs, prongs, extensions, etc. that may be operatively coupled to the base.

In a cross-sectional view, the biasing members 430-1 and 430-2 are shown extending downward from the base 410 to respective ends, which may be disposed at approximately a radius of a radius of the opening 420. In such a configuration, the opening 420 may receive a shaft where a surface 422 of the opening 420 may contact a surface of the shaft and where the ends of the biasing members 430-1 and 430-2 may be moveable at least axially with respect to the surface of the shaft (e.g., for movement upward and downward to exert an appropriate biasing force). Also shown in the cross-sectional view are portions of the coupling members 440-1 and 440-3. For example, the coupling members 440-1 and 440-3 may include riser portions and inwardly facing clip portions. In such an example, the clip portions may act to operatively couple the biasing cam 400 to a control arm, etc.

As an example, a method may include operatively coupling a biasing cam to a control arm and then operatively coupling a shaft thereto (e.g., as received by an opening of the biasing cam).

As an example, as to cam functionality, locations of the biasing members 430-1 and 430-2 may determine an orientation or orientations where biasing may occur (e.g., consider angles about a central axis that define such locations). For example, if an assembly includes an orientation where the biasing members 430-1 and 430-2 do not contact or exert biasing force against another component, the biasing members 430-1 and 430-2 may be considered to be non-biasing (e.g., a non-biasing position). However, if an assembly includes an orientation where the biasing members 430-1 and 430-2 contact and exert a biasing force against another component, the biasing members 430-1 and 430-2 may be considered to be biasing (e.g., in a biasing position).

As an example, a biasing member may include a disengaged orientation and an engaged orientation. As an example, a disengaged orientation may include a clearance between a portion of a biasing cam and another component. As an example, an engaged orientation may include contact between a portion of a biasing cam and another component, for example, where a biasing force is applied via the contact. As an example, an engaged orientation may include a transitional orientation, for example, where rotation of a biasing cam results in increased biasing force, increased axial displacement of a shaft, etc.

As an example, a biasing cam may include at least one biasing member that may be in a disengaged or non-biasing position or an engaged or biasing position, for example, depending on orientation of an assembly. As an example, an orientation of an assembly may be determined by orientation of a plug with respect to a wastegate seat, for example, that may correspond to orientation of a shaft operatively coupled to the plug (e.g., degrees of rotation of the shaft with respect to a bore, etc.).

FIG. 4 also shows an example of the biasing cam 400 operatively coupled to the control arm 344 where the opening 420 receives the shaft 352. Also shown in the example of FIG. 4 is a bushing 500 that includes recesses 510-1 and 510-2 that cooperate with the biasing members 430-1 and 430-2 of the biasing cam 400. As an example, the recesses 510-1 and 510-2 may, for example, receive portions of the biasing members 430-1 and 430-2 while providing axial clearance. In such an example, the biasing members 430-1 and 430-2 may be capable of axial movement within the recesses 510-1 and 510-2 for purposes of axial movement of the shaft 352 and self-centering of a plug, operatively coupled to the shaft 352, with respect to a wastegate seat.

As an example, contact may occur between the biasing members 430-1 and 430-2 and recess surfaces of the bushing 500 that may allow for some amount of biasing force to be applied therebetween. However, such an amount of biasing force may be less than that achieved when the biasing members 430-1 and 430-2 of the biasing cam 400 are moved to not align with the recesses 510-1 and 510-2. As an example, the recesses 510-1 and 510-2 may include at least one cambered (e.g., sloping) side such that the biasing members 430-1 and 430-2 may ride the cambered side, for example, in a manner that riding higher may exert a higher biasing force (e.g., consider a Hookean biasing force where force increases with compression).

As an example, an assembly may include a biasing cam that includes at least one biasing member and a component with at least one feature that can determine whether the at least one biasing member applies a biasing force. For example, the at least one feature may be a recess of a bushing that can, in a particular orientation, receive the at least one biasing member optionally with an axial clearance and that can, in a different orientation (e.g., or orientations), not receive the at least one biasing member or receive the at least one biasing member in a manner by which a biasing force is exerted between the biasing cam and the bushing (e.g., to take up, reduce, etc. axial play).

As an example, an assembly may include a biasing cam that can provide "zero clearance" between a bushing and a control arm for one or more orientations of the control arm with respect to the bushing and that can provide for clearance between the bushing and the control arm in a manner that can allow for centering of a plug with respect to a wastegate seat (e.g., where the plug is operatively coupled to the control arm, for example, via a shaft). In such an example, the biasing cam may be a spring that exerts force at certain plug opening angles (e.g., cam functionality). In such a manner, the biasing cam may reduce risk of rattling and associated noise while still allowing for self-centering of a plug with respect to a wastegate seat. In other words, as an example, a biasing cam may act selectively as a spring that can be loaded to remove clearance between a control arm and a bushing if a plug is open but may not be loaded if the plug is closed. As an example, a biasing cam may include a linear coil spring (e.g., positioned between a control arm and a housing, etc.). As an example, a spring may be a metal spring.

As an example, a biasing cam may assist with opening of a plug with respect to a wastegate seat. For example, where an actuator exerts a downward force to maintain a plug in a closed position, the biasing cam may have a clearance such that it does not exert an opposing force. Whereas, upon opening of the plug, the actuator must overcome the downward force by applying an upward force; noting that, upon rotation of the biasing cam, it too may apply an upward force. Thus, in such an example, the biasing cam may reduce an amount of upward force to be exerted by such an actuator (e.g., once the biasing cam engages and exerts its biasing force).

Figure 6:
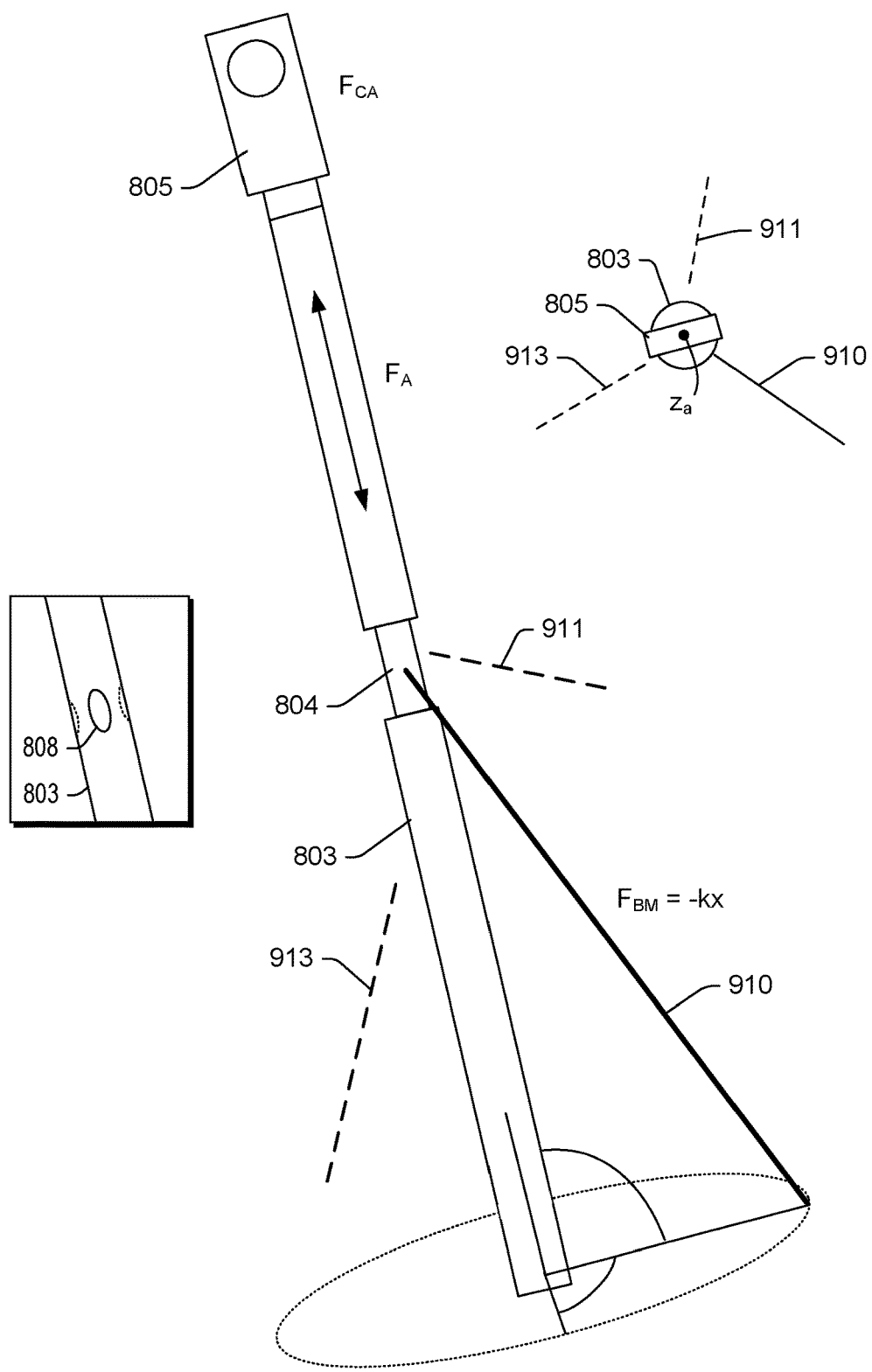
FIG. 6 is a diagram that illustrates examples of various degrees of freedom of a control rod with respect to examples of various forces.

FIG. 4 further shows examples of the assembly in two orientations, a so-called 0 degrees orientation (e.g., a disengaged orientation) and a Φ degrees orientation (e.g., an engaged orientation) where the biasing member 430-1 of the biasing cam 400 is engaged by a surface of the busing 500. Various dimensions are shown in FIG. 4. As an example, a biasing cam and bushing clearance may be altered in a manner dependent on orientation of the control arm 344 with respect to the bushing 500. For example, a method may include orienting the biasing member 430-1 of the biasing cam 400 with respect to the recess 510-1 of the bushing 500 for altering a biasing cam to bushing axial clearance. As shown in the example of FIG. 6, altering may include moving the shaft 352 axially outwardly away from the turbine housing 310.

FIG. 4 shows examples of the assembly in the two orientations. As shown, one orientation is associated with a closed orientation (e.g., or position) of the plug 356 with respect to the wastegate seat 326 and the other orientation is associated with an open orientation (e.g., or position) of the plug 356 with respect to the wastegate seat 326 (e.g., where the shaft 352 is translated axially outwardly by a biasing force exerted by the biasing cam 400).

As shown in the examples of FIG. 4, a clearance may be reduced between a face 505 at the end of the bushing 500 and a face 355 at the end of the arm 354 when the plug 356 transitions from a closed orientation to an open orientation with respect to the wastegate seat 326. As an example, a reduction in clearance may act to impede gas flow (e.g., exhaust leakage) at an interface or interfaces, for example, as bias exerted by a biasing cam may act to pull the 355 against the face 505 of bushing 500.

As an example, during operation, a chamber space of a turbine assembly may have a pressure that exceeds an ambient pressure. In such an example, a pressure differential may act as a driving force for flow of exhaust from the chamber space to an ambient space. As such a flow of exhaust may occur prior to an exhaust gas treatment unit (see, e.g., the unit 107 of FIG. 1), it may be detrimental as to a goal of achieving an environmental standard or standards. As an example, wastegating may occur to avoid excessive boost to an internal combustion engine. As an example, wastegating may act to increase a pressure differential between a chamber space and an ambient space. In the example of FIG. 4, an axially outward shift of the shaft 352 responsive to action of the biasing cam 400 being rotated to a biasing position as an actuator acts to effectuate wastegating, such a shift may act to reduce a clearance or clearances that act to impede flow of exhaust gas from the chamber 330 to an ambient space via the bore 312. Such an approach may act to reduce rattling, vibration, etc., which, in turn, may act to reduce flow of exhaust gas from the chamber 330 to an ambient space via the bore 312.

Figure 5:
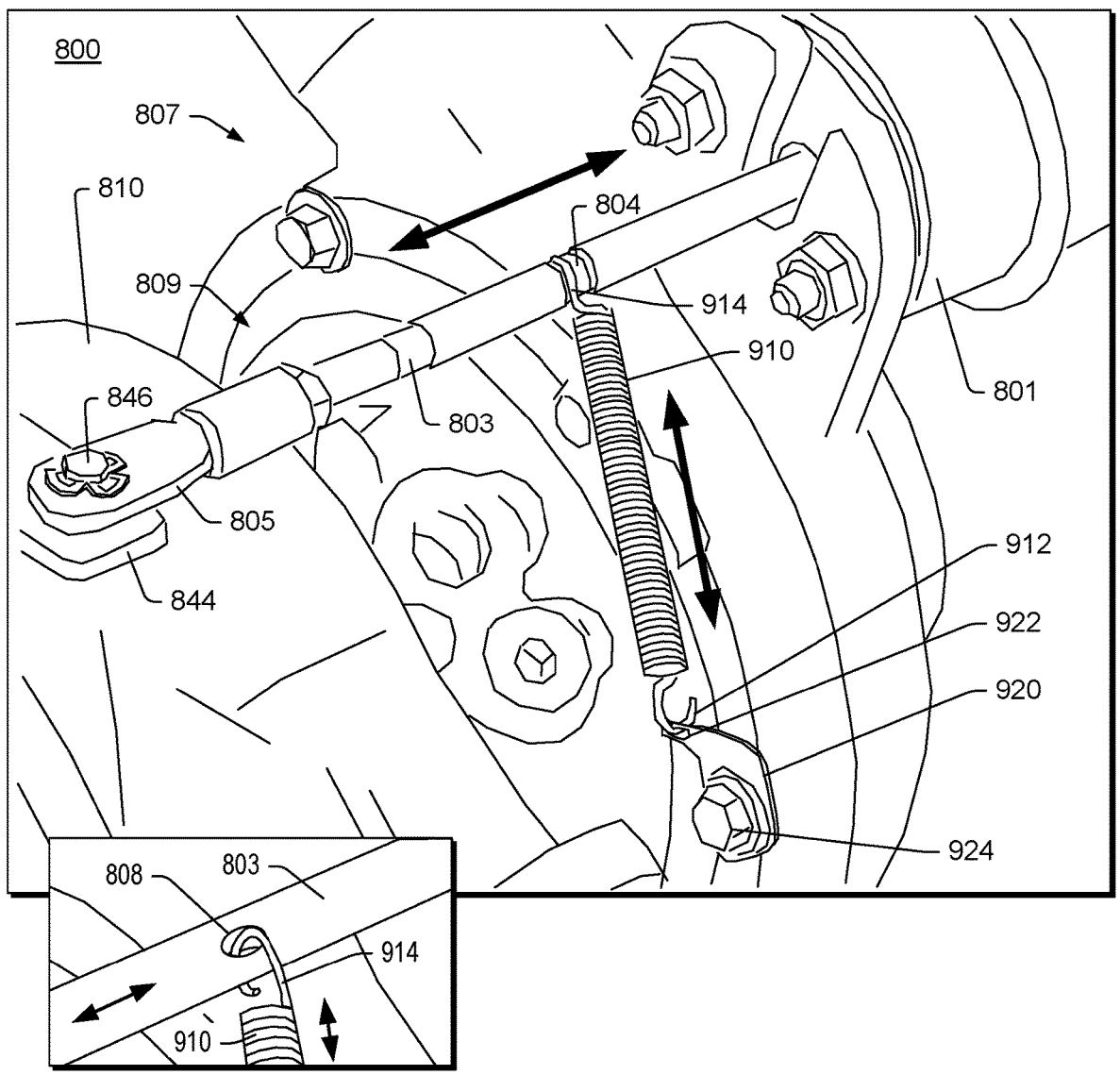
FIG. 5 is a perspective view of an example of an assembly that includes an example of a biasing mechanism.

FIG. 5 shows an example of an assembly 800 that includes an actuator 801 operatively coupled to a control rod 803 (e.g., a control link or actuator link) that includes a notch 804. In the example of FIG. 5, the actuator 801 is coupled to a compressor housing 807 that is coupled to a center housing 809 that is coupled to a turbine housing 810 that includes a wastegate valve controllable via a control arm 844 (e.g., via rotation of the control arm 844).

As shown in the example of FIG. 5, a peg 846 extends from the control arm 844 where the peg 846 is coupled to the control rod 803, for example, via a coupler 805 that may be adjustable (e.g., as to axial position along with respect to the control rod 803 via threads, etc.). As shown, a spring 910 may be provided as a biasing mechanism. In the example of FIG. 5, the spring 910 may be a coil spring that includes a fixed end 912 that operatively couples to the compressor housing 807 via a clamp 920 (see, e.g., an opening 922 in the clamp 920) and that includes a movable end 914 that operatively couples to the control rod 803 via the notch 804 (e.g., or other feature such as an opening, etc.). For example, an inset view of a portion of an assembly shows an example of an opening 808 in the control rod 803 where a movable end 914 operatively couples to the control rod 803 via the opening 808.

In the example of FIG. 5, various components may be arranged such that the spring 910 exerts a biasing force on the control rod 803 in a manner that depends on position of the control rod 803 as controlled by the actuator 801. For example, the spring 910 may not exert a load (or exert a partial load) when the plug coupled to the control arm 844 is about to close (e.g., or in a closed position) and the spring 910 may exert an increased load with respect to increased stroke of the control rod 803, for example, for opening the plug (e.g., opening a wastegate for wastegating). In such an example, the direction of force exerted by the spring 910 on the control rod 803 may act to pull a shaft coupled to the control arm 844 in an outward direction, for example, to minimize a gap or clearance. As an example, the spring 910 may, in a first state, allow for axial movement of a shaft coupled to the control arm 844 where such movement may facilitate centering of a plug, coupled to (e.g., optionally integrally) to the shaft, with respect to a wastegate seat of the turbine housing 810. In such an example, the spring 910 may, in a second state, cause axial movement of the shaft outwardly, for example, to reduce a clearance (e.g., between a face of a bushing and a face of the shaft).

FIG. 6 shows an example of the control rod 803 of FIG. 5 with respect to the spring 910, which is an off-axis biasing mechanism in that its axis does not align with that of the control rod 803. As an example, the spring 910 may be characterized at least in part by a spring constant k, for example, as in an equation $F_{BM}=-kx$ where x may be a length dimension or position of the spring 910. As shown in the example of FIG. 6, an actuator force $F_A$ may be applied to the control rod 803, for example, as including a component along the axis of the control rod 803 (e.g., a primary component of actuator force). Also shown in the example of FIG. 6 is a control arm force $F_{CA}$ as associated with a control arm being operatively coupled to the coupler 805.

As shown in the example of FIG. 6, one or more biasing mechanisms 910, 911 and 913 may be operatively coupled to the control rod 803 or a component operatively coupled to the control rod 803. In such an example, the one or more biasing mechanisms 910, 911 and 913 may be off-axis and change in length responsive to movement of the control rod 803. One or more off-axis biasing mechanisms (e.g., springs, etc.) may act to apply force to a control rod or a control link in a manner that depends on position of the control rod or the control link, for example, as controlled by an actuator that may control opening and/or closing of a wastegate valve (e.g., position of a wastegate plug with respect to a wastegate seat).

Figure 7:
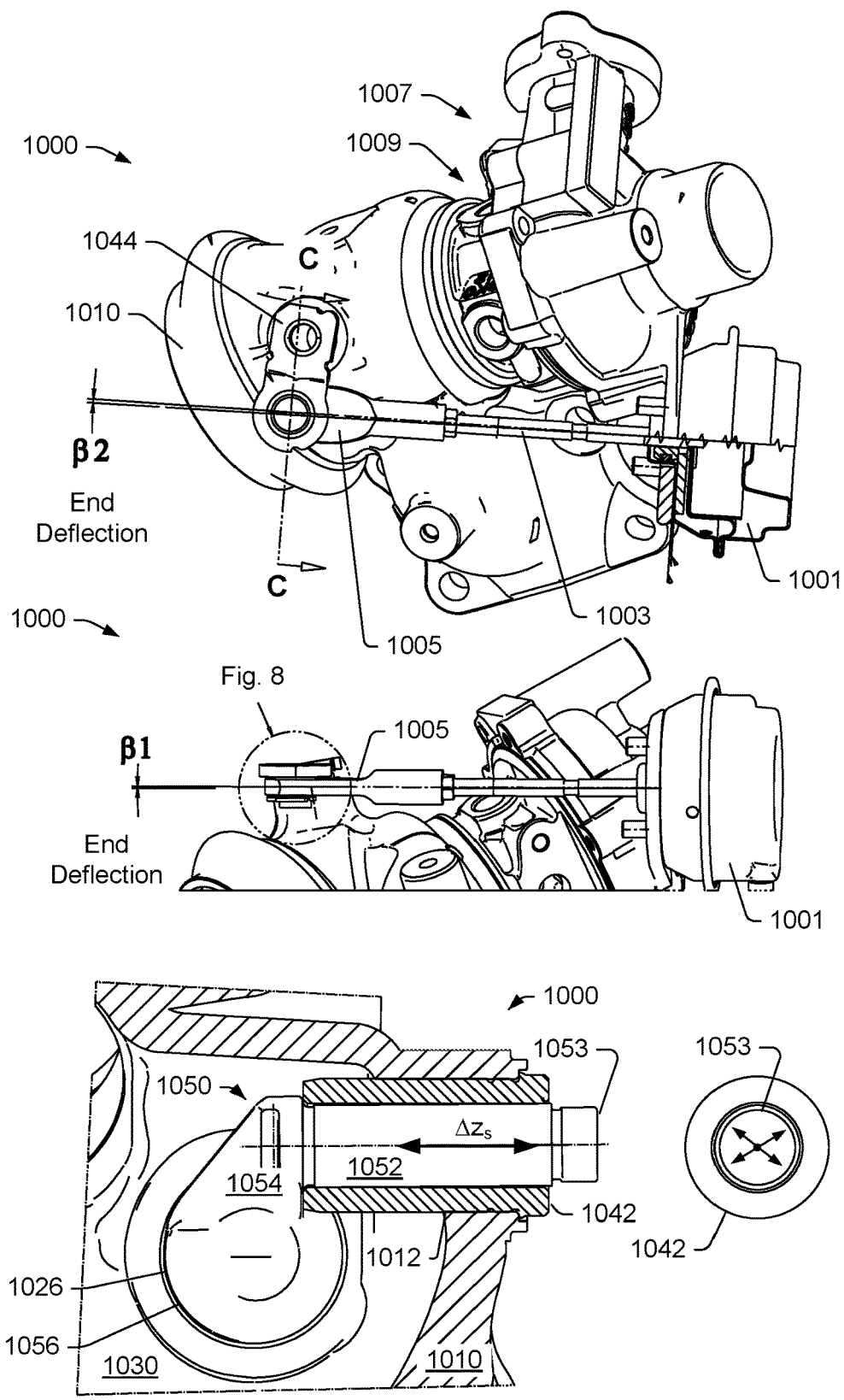
FIG. 7 is a series of views of an example of an assembly that illustrates examples of deflections.

FIG. 7 shows an example of an assembly 1000 that includes an actuator 1001 operatively coupled to a control link 1003 (e.g., an actuator link) via a coupler 1005 (e.g., a rod end, etc.). In the example of FIG. 7, the actuator 1001 is coupled to a compressor housing 1007 that is coupled to a center housing 1009 that is coupled to a turbine housing 1010 that includes a wastegate valve controllable via a control arm 1044 (e.g., via rotation of the control arm 1044).

A cutaway view shows the turbine housing 1010 as including a bore 1012, a wastegate seat 1026, a chamber 1030, a bushing 1042 and a wastegate arm and plug 1050 that includes a shaft 1052 with a shaft end 1053, an arm 1054 and a plug 1056.

As shown in FIG. 7, the control link 1003 may experience deflections such as end deflection in a direction β1 and end deflection in a direction β2. As indicated in the cutaway view, the shaft 1052 may experience movement along its axis as well as angular movement that, for example, off-sets the axis of the shaft 1052 from an axis of the bore 1012 and/or an axis of the bushing 1042. For example, tilting of the shaft 1052 may cause the shaft 1052 and/or the bushing 1042 to form points of contact that differ at portions of the shaft 1052 and/or the bushing 1042 with respect to the bushing 1042 and/or the bore 1012, respectively.

Figure 8:
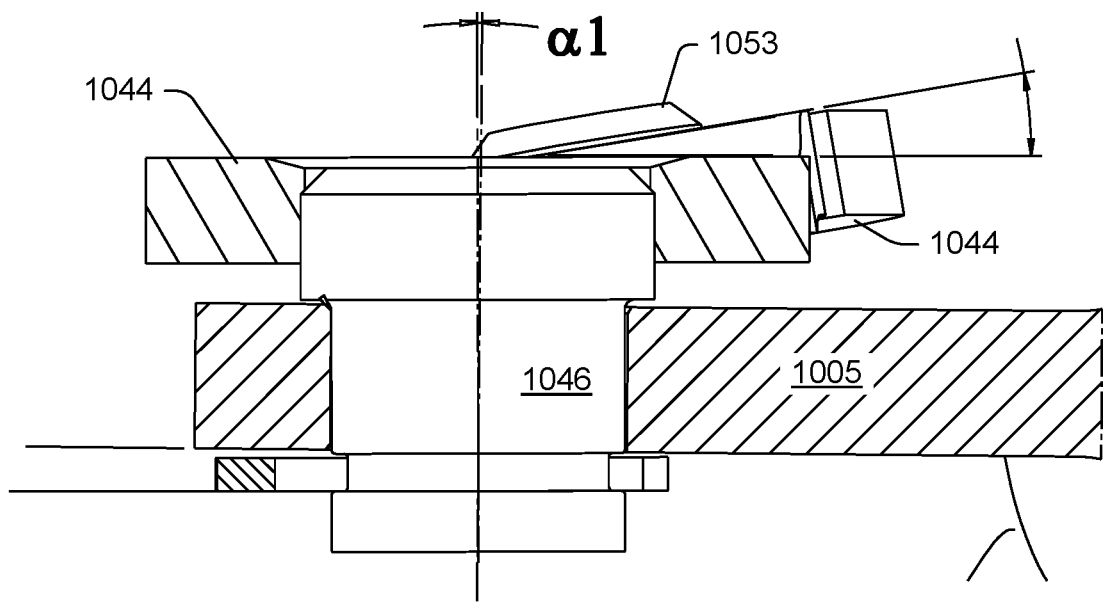
FIG. 8 is a series of views of portions of the assembly of FIG. 7.
Figure 8:
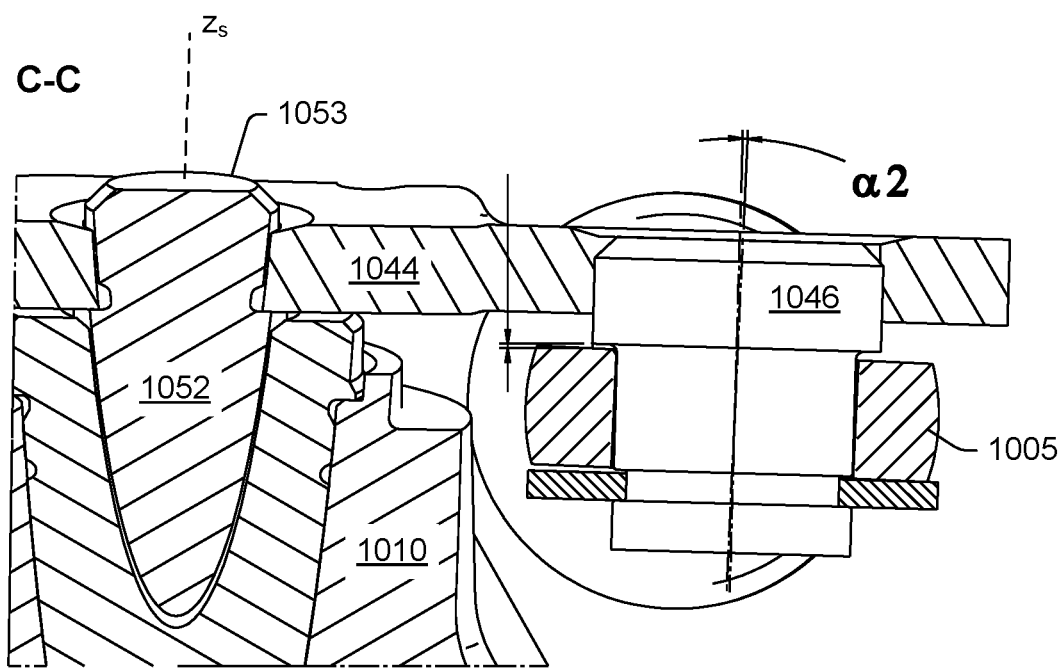
Figure 9:
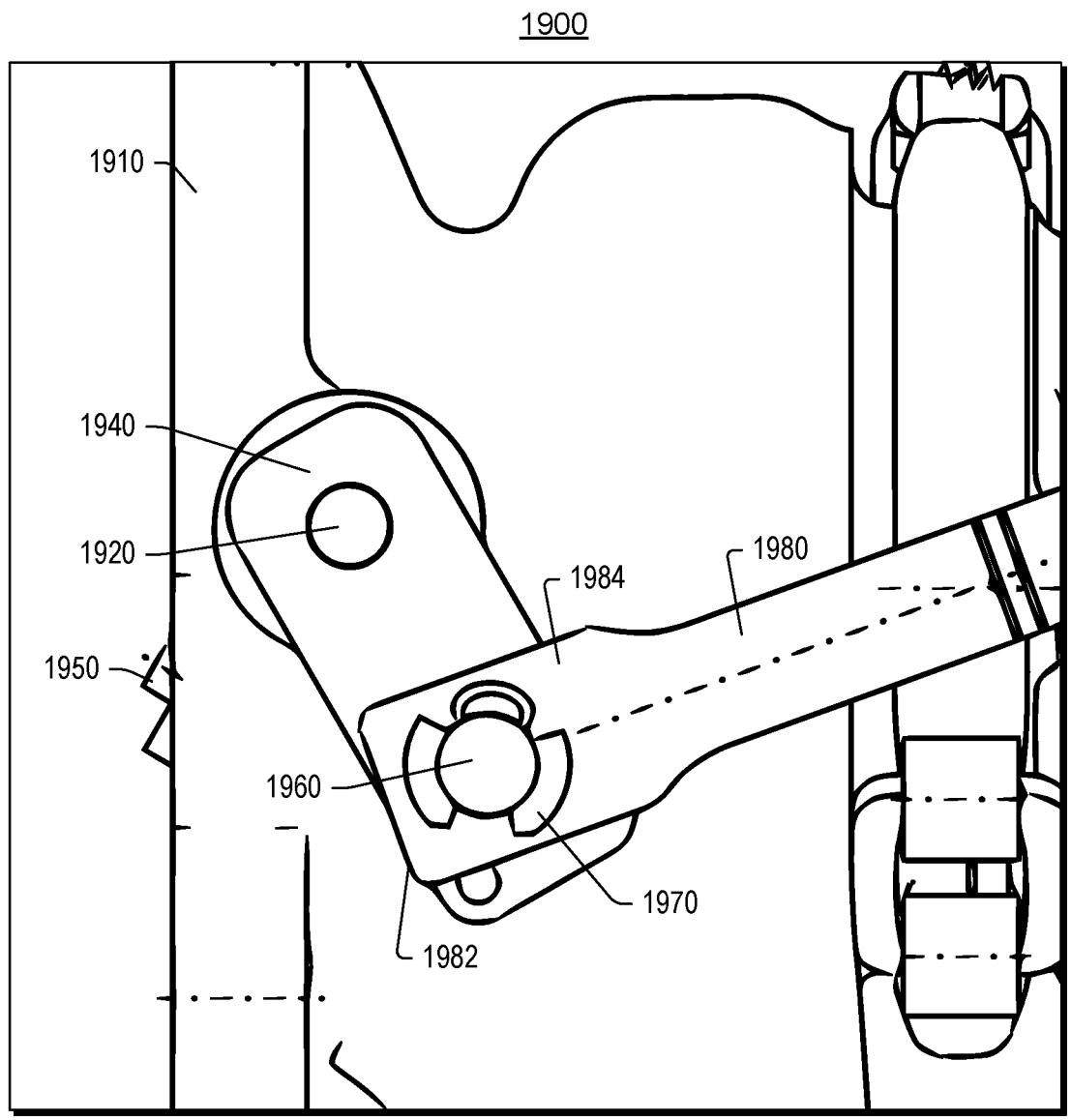
FIG. 9 is a view of an example of an assembly.
Figure 10:
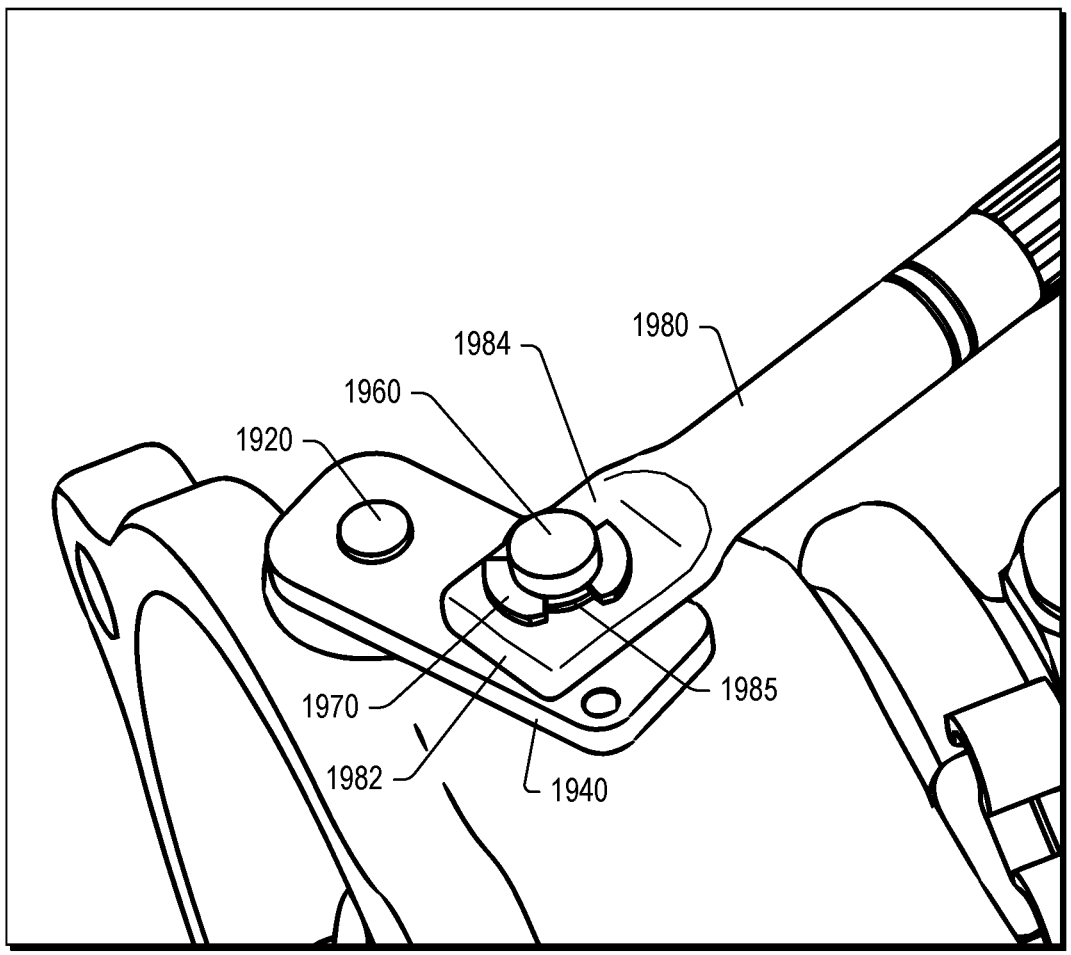
FIG. 10 is another view of the assembly of FIG. 9.
Figure 11:
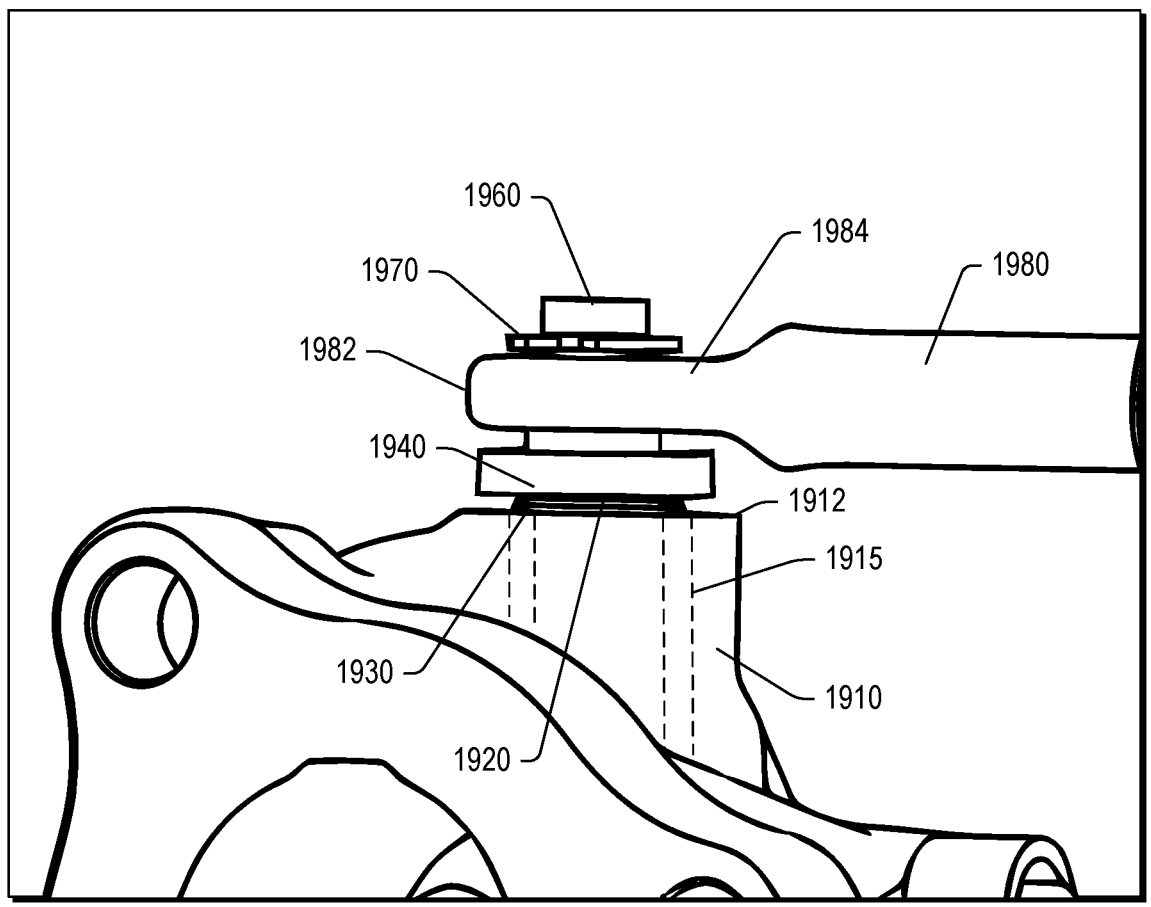
FIG. 11 is another view of the assembly of FIG. 9.
Figure 12:
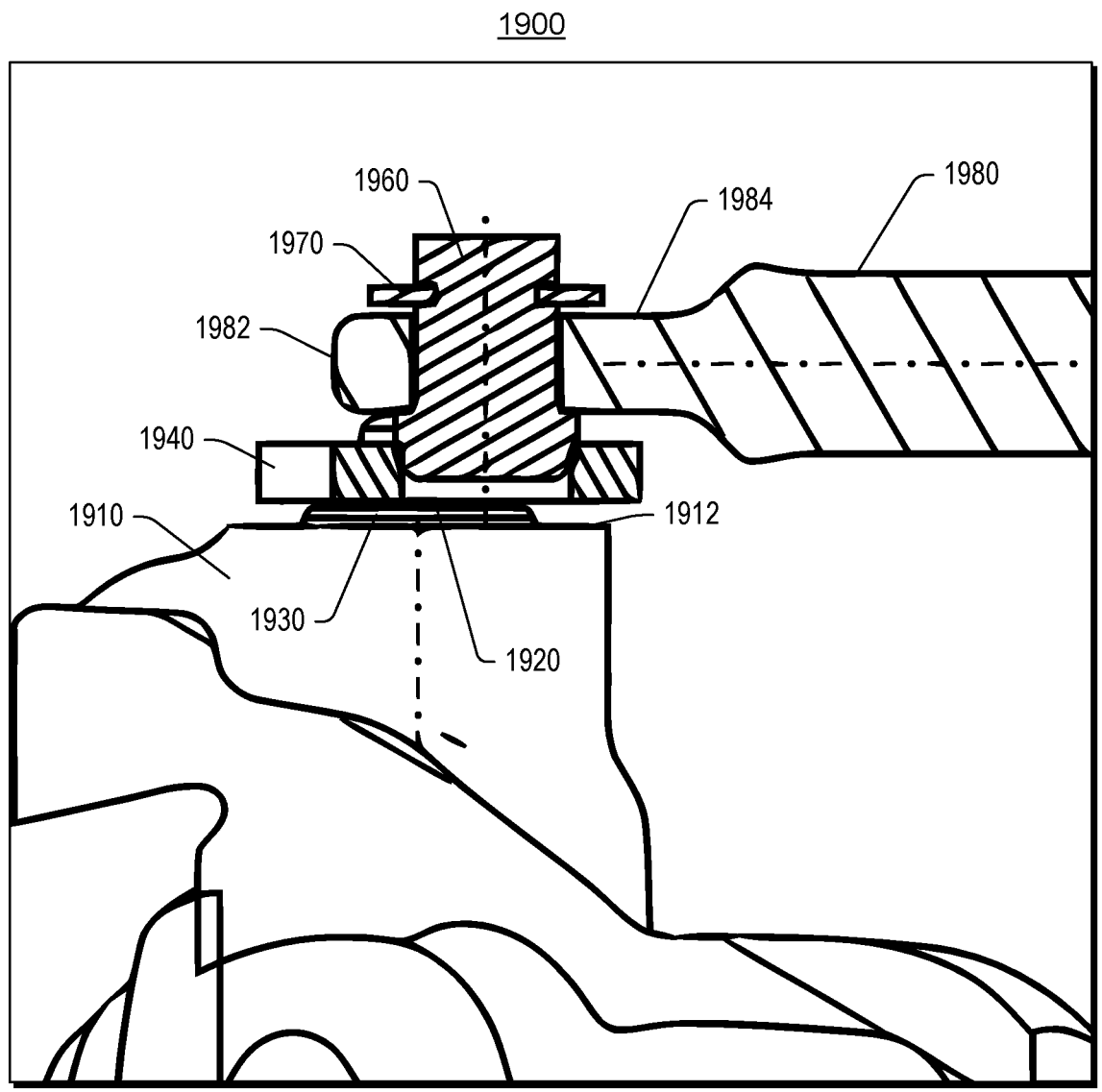
FIG. 12 is another view of the assembly of FIG. 9.

FIG. 8 shows cutaway views of portions of the assembly 1000 of FIG. 7, including a cutaway view along a line C-C. As shown in FIG. 7, a control arm 1044 may be operatively coupled to the control link 1003 (e.g., an actuator link) via a peg 1046 and the peg 1046 may experience deflections such as end deflection in a direction α1 and end deflection in a direction α2. Such deflections may be due to forces. As an example, one or more biasing mechanisms may be included in the assembly 1000 that can apply force to reduce one or more deflections, increase one or more deflections, etc.

As an example, a turbocharger's wastegate controller (e.g., including an actuator) and associated linkage can modulate an amount of exhaust gas used for powering an exhaust gas turbine of the turbocharger. For example, a wastegate (e.g., a wastegate valve) may act to direct excessive exhaust gas for bypass of a turbine stage. A controller can be coupled to a linkage that couples to a wastegate where the controller can be actuated to cause the wastegate to move, for example, to move toward a closed state, to move toward an open state, etc. In such an example, the close state can cause exhaust gas to be directed to a turbine wheel while the open state can cause at least a portion of exhaust gas exiting one or more cylinders of an internal combustion engine to bypass the turbine wheel (e.g., via a conduit, a chamber, etc.).

Various types of controllers exist. For example, a controller can include a pneumatic actuator and/or an electric actuator. As an example, an actuator may include one or more components that move in a rotary and/or in a linear manner. For example, a rotary movement component can rotate and a linear movement component can translate while a rotary/linear movement component can rotate and translate (e.g., at different times and/or at the same time, simultaneously).

As an example, a rotary electric actuator (REA) can be an electro mechanical device that can be mounted, for example, on a compressor housing and connected to a wastegate control linkage. As an example, such an actuator may be operatively coupled to an Engine Management Unit (EMU) (e.g., or ECU), for example, via one or more signaling mechanisms (e.g., analog, digital, pulse-width modulation (PWM), controller area network (CAN), etc.) for receiving one or more control signals (e.g., optionally transmitting one or more signals, etc.). Electric actuation may offer faster response than pneumatic actuation. For example, a REA may be able to respond more rapidly to a control signal; consider a scenario where it may respond in about one third of the time (e.g., consider a response of about 150 ms versus a response of about 500 ms). As an example, an REA can include on-board position sensing. As an example, faster response and more precise control can help improve engine performance, fuel efficiency and emissions control.

As an REA may not rely on an internal combustion engine as a pressure source as with some pneumatic actuators, it may provide for operation without a so-called vacuum systems. As an example, an REA may include circuitry that can provide information to assist with diagnostics, etc.

As mentioned, an REA can operate with a response time that can be less than that of a pneumatic actuator. Where slack exists in a control linkage (e.g., due to clearances, lack of load, etc.), upon application of force by an REA, a taking up of the slack may be accompanied by contacting between components, which may generate noise, lead to wear, etc. Over time, controllability may be impacted. Where an REA provides information germane to positioning, diagnostics, etc., the quality of such information may be impacted. For example, changes in positions may be known with less certain due to clearances, slack, etc., and taking up of clearances, slack, etc.

As an example, a method can include determining one or more tolerance stack-ups or tolerance stacks as to effects of accumulated variation(s) that may be allowed by specified dimensions and tolerances associated with joints of a control linkage. Such a method may include selecting a biasing element and/or one or more points of contact for a biasing element (e.g., coupling points) that can act to load the joints. In such an example, an assembly that includes a biasing element that loads joints may be operated where loading acts to reduce noise, wear, etc.

As an example, an actuator can be used together with a linkage, which can be a kinematic chain of operatively coupled components that mechanically connect a particular actuator with a wastegate (e.g., a wastegate valve).

As an example, a linkage can include a plurality of "bars" (e.g., bar or bar-like components). For example, consider a mechanism topology that includes a four-bar linkage for a rotary actuator or crank mechanism that may be used for a linear actuator.

As an example, a four-bar linkage (e.g., a "four-bar") can be a movable "closed chain" linkage that includes four bodies, called bars or links, connected via joints. As an example, two joints may be substantially fixed and two joints may be movable (e.g., floating joints). For example, a joint at an actuator and a joint at a turbine housing may be substantially fixed where at such a joint a component (e.g., a rotational pin driven by an electric motor and a shaft of a wastegate) can rotate while its axis of rotation remains steady (e.g., rotational pin axis and shaft axis).

As an example, a linkage can include joints. For example, consider a joint type such as a cylindrical rotary joint (e.g., a cylindrical pin in a cylindrical opening or bore). Such a joint can introduce radial and axial clearances that cover assembly tolerances (stack-up) and, for example, what may be called technological tolerances. One or more clearances may lead to one or more issues when a linkage is unloaded. As an example, issues may include one or more of noise issues, wear issues and also position hysteresis issues.

As an example, a biasing element may be characterized at least in part by its elasticity. As an example, a biasing element may be characterized at least in part by linear and/or non-linear elasticity. As an example, one or more linearizing assumptions of linear elasticity can include infinitesimal strains or relatively "small" deformations (or strains) and substantially linear relationships between the components of stress and strain. As an example, linear elasticity may be considered valid for stress states that do not produce yielding (e.g., yielding that would cause failure of a biasing element). As an example, a biasing element may be characterized at least in part by Hooke's law, for example, as a first order linear approximation to a real response of a spring or another elastic body (e.g., to applied force).

As an example, a biasing element may be located at a "hot" joint or at a "cold" joint. In such an example, the "hot" joint may be closer to an exhaust gas turbine than the "cold" joint. As an example, a joint that includes a shaft of a wastegate that is received by a bore of a turbine housing may be considered a hotter or a hottest joint. As an example, a biasing element may be located at a joint that is not the hottest joint in a control linkage.

As to locating a biasing element at a "hot" joint, as mentioned, a hot joint may be exposed to heat energy that may cause thermal expansion and/or otherwise affect one or more components. As an example, clearances may change in a temperature dependent manner, which, in turn, may affect contacting, friction, wear, noise, etc. As a "hot" joint may be in a relatively harsh environment that may include temperature cycling and repetitive motion at elevated temperatures well above ambient temperatures, a biasing element disposed at such a joint may act to "control" relationships between joint components in a manner that can reduce wear, noise, etc.

As an example, a joint may be a pivot joint. For example, a pivot joint can include a pivot axis as defined, for example, via a pin (e.g., a peg, etc.). In such an example, the pin may be fixed or rotational with respect to one or more components of the pivot joint. As an example, a component can include an opening (e.g., a bore) that receives at least a portion of a pin to form a joint where the pin may be fixed to another component that forms the joint. As an example, a pin may be coupled to one or more components and may be fixed or rotational with respect to one or more components (e.g., consider a pin set in a bore of one link and set in a bore of another link yet independently rotational within the bores). As an example, one or more of a C-clip, a cotter pin, etc., may secure a pin (e.g., a peg, etc.) with respect to a link or links.

As an example, a biasing element may be positioned such that its exposure to heat (e.g., heat energy) may be reduced, for example, less than that of a turbine housing at a bore for a wastegate shaft. As an example, a biasing element may be coated at least in part with a material that is a thermal insulator. In such an example, transfer of heat energy to the biasing element and/or a rate of heat energy transferred to the biasing element may be reduced. As an example, a thermal barrier coating may be included on at least a portion of a biasing element and/or on at least a portion of a component that is in contact with a biasing element. As an example, a thermal barrier may include a bond layer, thermally grown oxide layer, and ceramic layer (e.g., yttria-stabilized zirconia (YSZ), etc.).

As an example, a biasing element may act to reduce one or more of noise, wear, hysteresis, and actuator load. As an example, proper direction and dimensioning of stiffness of a biasing element, may allow for decreasing actuator power (e.g., torque) compared to an assembly without such a biasing element. For example, a biasing element may provide a load to a joint that corresponds to a clockwise direction of rotation or to a counter-clockwise direction of rotation of an electric motor shaft of an electric actuator (e.g., an REA) and/or to a direction of rotation of a linear actuator, whether electronic, pneumatic, etc. Such a load may correspond to a force direction for maintaining a closed state or an open state of a wastegate plug with respect to a wastegate seat. As an example, a biasing element may provide for reducing a size, a power rating, a torque rating, linear force rating, etc. of an actuator compared to an assembly that does not include the biasing element.

As an example, a method can include drilling one or more holes in a component and coupling a biasing element to a component via one or more drilled holes. In such an example, a drilled hole or holes may include a sleeve that may be a thermal barrier material (e.g., an insulator).

As an example, a biasing element may be a multi-piece biasing element, for example, pieces coupled in series and/or in parallel. As an example, a method can include providing a pin that is of an increased height, for example, to allow for accommodation (e.g., fitting of) a biasing element. As an example, a method can include providing a crank (e.g., a control arm) that may be shaped to operatively couple to a biasing element and/or to accommodate a biasing element. For example, a crank may be shaped with an end and/or an extension that can include a feature (e.g., a notch, an opening, a hook, etc.) for coupling to a biasing element. As an example, as to shape, a crank may be "tiered" in that a first tier provides for coupling to a first pin and a second tier provides for coupling to a second pin. As an example, a tier, tiers, a portion or portions between tiers, etc., may provide for a desired alignment of a biasing element. As an example, a feature may be or include an opening, a notch, a hook, etc., for coupling a biasing element (e.g., an end or end fixture of a biasing element).

As an example, a biasing element may be included in an assembly optionally along with a biasing cam such as, for example, the biasing cam 400. In such an example, the biasing cam may apply force to a joint and a biasing element may apply force to the joint.

As an example, a biasing element may be a torsion spring or include one or more torsion springs. As an example, if not twisted beyond an elastic limit, a torsion spring may, for example, obey an angular form of Hooke's law:

$$\tau = -k\theta$$

where τ is the torque exerted by the spring in newton-meters, and θ is the angle of twist from its equilibrium position in radians, k is a constant with units of newton-meters/radian, variously called the spring's torsion coefficient, torsion elastic modulus, rate, or spring constant, for example, equal to a change in torque required to twist the spring through an angle of 1 radian. Such an approach can be somewhat analogous to the spring constant of a linear spring. Above, the negative sign indicates that the direction of the torque is opposite to the direction of twist.

As an example, energy U, in joules, stored in a torsion spring may be estimated via an equation such as, for example:

$$U = \tfrac{1}{2} k \theta^2$$

As an example, a torsion spring may operate by torsion or twisting; that is, a flexible elastic object that stores mechanical energy when it is twisted. When it is twisted, it exerts force (torque) in the opposite direction, which may be proportional to the amount (angle) it is twisted. As an example, a torsion bar may be a straight bar of metal or rubber that is subjected to twisting (shear stress) about its axis by torque applied at its ends. As an example, a helical torsion spring may be a metal rod, wire, etc., in the shape of a helix (e.g., a coil) that is subjected to twisting about the axis of the coil by sideways forces (bending moments) applied to its ends, twisting the coil tighter. In a helical torsion spring, forces acting on the rod, wire, etc., can be characterized as bending stresses (e.g., rather than torsional (shear) stresses).

As an example, one or more biasing mechanisms may act to firm-up a shaft of a wastegate valve, especially where the valve is in an open position. In such an example, the firming-up may act to reduce rattling, noise, exhaust leakage, etc.

As an example, an assembly may include clearances between parts in kinematics where, for example, the parts are operatively coupled to an actuator, a control linkage, etc. of a turbocharger. One or more clearances may allow for movement that may lead to noise, wear, etc. As an example, one or more biasing mechanisms may be included in a turbocharger assembly that act to eliminate and/or damp movement (e.g., vibration damping, etc.). As an example, one or more biasing mechanisms may provide for "zero clearance" kinematics at one or more interfaces between components.

As an example, an assembly may include multiple biasing features. As an example, an assembly may include multiple springs. In such an example, a control rod or a control link may include features for coupling one or more springs to the control rod or the control link, for example, to exert a biasing force to the control rod or the control link that acts to move a shaft operatively coupled to a wastegate plug, optionally in a manner where the biasing force varies depending on the position of the control rod or the control link (e.g., consider an axial position, as controlled via an actuator). As an example, in a cylindrical coordinate system with a z-axis defined along a control axis of a control rod or a control link, one or more springs may be operatively coupled to the control rod or the control link where such one or more springs extend at an angle (e.g., or angles). In such an example, the one or more springs may act to shift the z-axis in space, for example, in a manner that acts to move a shaft (e.g., in at least an axial direction along an axis of the shaft) that is operatively coupled to the control rod or the control link (e.g., via a control arm, etc.). In such an example, a shift may depend on position of the control rod or the control link as controlled by an actuator (e.g., for opening or closing a wastegate valve).

An assembly can include a turbine housing that includes a bore, a wastegate seat and a wastegate passage that extends to the wastegate seat; a bushing disposed at least in part in the bore; a rotatable wastegate shaft received at least in part by the bushing; a wastegate plug that extends from the wastegate shaft; a control arm operatively coupled to the wastegate shaft; a control link operatively coupled to the control arm; a pin that forms a joint between the control arm and the control link; and a biasing element coupled to the pin and to the control link. In such an example, the assembly can include an actuator operatively coupled to the control link.

A control linkage can include clearances. For example, clearance between a rod end of a control rod and a pin operatively coupled to a crank can allow for at least some amount of rotation of the rod end with respect to the pin. Due to external solicitation of the rod end and/or the pin, parts can move and generate noise (e.g., via contacting while taking up slack, contacting during movement(s), etc.).

As an example, one or more biasing elements may be positioned to suppress at least a portion of a clearance between parts while still allowing for at least some amount of movement of a rod end of a control rod with respect to a pin.

As an example, a biasing element can be a spring such as, for example, a spring clip. As an example, a spring clip may work within an assembly via compression (e.g., rather than by traction). Such an approach may act to reduce kinematic noise.

As an example, a biasing element may operate to reduce vibration and/or shock that may occur between parts. As an example, a biasing element can apply a load that can be defined as operating between two axes. For example, a spring can include a first leg and a second leg where the first leg is disposed within an opening of a pin (e.g., a peg). In such an example, the second leg may be operatively coupled to a portion of a rod end of a control rod such that the spring applies a compressive force that acts to reduce clearance between the pin and the rod end (e.g., an opening of the rod end that receives at least a portion of the pin). As an example, the force applied by the spring may act to bring the pin and the rod end into contact and may act to maintain such contact, for example, even when a load is not applied to a control rod via an actuator or, for example, when a load is not applied to a control arm operatively coupled to a shaft of a wastegate.

As an example, a spring can apply a compressive force that acts to damp vibrations and shocks. As an example, a compressive force may be characterized via one or more force vectors. As an example, vector direction for an applied load may be measured in degrees, for example, as an angle of about 45 degrees or about 90 degrees, for example, with respect to a shock/vibration axis on a kinematic component (e.g., or defined by components). As an example, a spring may be a coil spring. As an example, a spring may be a multi-coil spring. As an example, a multi-coil spring may include coils in series and/or coils in parallel. As an example, coils in parallel may be operatively coupled at an axis at one end (e.g., or shoulder, etc.) and may extend as rays outwardly therefrom. For example, consider a three-coil arrangement where the three-coils extend outwardly from a substantially common coupling position in an arc span of about 90 degrees (e.g., a coil at 0 degrees, a coil at 45 degrees and a coil at 90 degrees).

As an example, an assembly can include one or more of the following: a biasing element that applies a traction/pulling load (e.g., coupled via two holes, one hole in one component and one hole in another component, etc.); and a biasing element that applies a compression load (e.g., in part via an opening or hole in a pin).

As an example, a pin may be drilled to include a stepped bore. For example, drilling from a first end with a bit of a first diameter and drilling from a second end with a bit of a second diameter where the first and second diameters differ. In such an example, to form a through bore in the pin, drilling from one end or the other end may be less than an entire distance along a length of the pin. For example, drilling can be to a first depth from one end and to a second depth from another end where the first and second depths sum to an entire distance along a length of a pin. As an example, some overlap may occur for a second drilling with respect to an opening formed by a first drilling. For example, a small diameter hole may be drilled to a depth of about 0.6*L where L is a pin length and a larger diameter hole may be drilled to a depth of just over about 0.4*L such that the two holes form a through bore. Where the second larger diameter hole is drilled further, it may determine what portion of the through bore has the larger diameter and what portion of the through bore has the smaller diameter (e.g., consider drilling the second, larger diameter hole to about 0.5*L to form about a 50/50 through bore).

As an example, a pin can include a through bore that receives a leg of a spring that act to apply a compressive force to the pin with respect to a rod end of a control rod where the pin is disposed at least in part in an opening of the rod end. Such an example may provide for clearance axis compensation between a rod end and a pin.

FIGS. 9, 10, 11 and 12 show an example of a portion of an assembly 1900 that includes a turbine housing 1910, a wastegate shaft 1920 and a bushing 1930 where the wastegate shaft 1920 is disposed at least in part in the bushing 1930, which is disposed at least in part in a bore 1915 of the turbine housing 1910. As shown, the turbine housing 1910 includes a boss that extends outwardly from a volute portion of the turbine housing 1910 to an end surface 1912. The boss includes the bore 1915 as a through bore to seat the bushing 1930 and the shaft 1920 as supported by the bushing 1930. The bore 1915 extends from the end surface 1912 of the boss of the turbine housing 1910 to an inner surface of the turbine housing 1910 which forms at least in part an exhaust gas chamber (e.g., with an opening for wastegating exhaust gas).

As shown, the shaft 1920 is operatively coupled to a control arm 1940, for example, via one or more of an interference fit, via a weld, via a set screw, etc. In the example of FIGS. 9, 10, 11 and 12, the control arm 1940 includes a pin 1960 (e.g., a peg, etc.) where a rod end 1984 of a control rod 1980 includes an opening 1985 that can receive at least a portion of the pin 1960. As shown, the rod end 1984 includes a free end or free surface 1982.

In the example of FIGS. 9, 10, 11 and 12, the rod end 1984 includes an upper surface and a lower surface where at least the lower surface is substantially planar and the control arm 1940 includes an upper surface and a lower surface where at least the upper surface is substantially planar. In such an example, the control arm 1940 and the rod end 1984 may be in close proximity where the lower surface of the rod end 1984 faces the upper surface of the control arm 1940. As an example, the pin 1960 may include a shoulder that acts to displace lower surface of the rod end 1984 a distance from the upper surface of the control arm 1940. In the lower view of FIG. 9, such a displacement is illustrated as the lower surface of the rod end 1984 is displaced a distance from the upper surface of the control arm 1940.

As shown in the example of FIGS. 9, 10, 11 and 12, a C-clip 1970 is fit to the pin 1960 (e.g., in a recessed annular groove) to help secure the rod end 1984 such that it does not become decoupled from the pin 1960. Should decoupling be desired, the C-clip 1970 may be removed and the rod end 1984 translated with respect to the pin 1960 to remove the pin 1960 from the opening 1985 of the rod end 1984.

As an example, an amount of axial clearance may exist for the rod end 1984 with respect to the C-clip 1970 (e.g., or other retention component, mechanism, etc.). Such a clearance may allow for movement of the rod end 1984 with respect to the pin 1960. As mentioned, depending on alignments, some axial play may be desirable. Referring again to FIG. 8, some amount of axial clearance is illustrated between the peg 1046 and the coupler 1005 of the control link 1003. Such clearance may allow for some deflection of the coupler 1005 with respect to the peg 1046.

In the example of FIGS. 9, 10, 11 and 12, as the rod end 1984 is moved to the left, the shaft 1920 rotates clockwise; whereas, when the rod end 1984 is moved to the right, the shaft 1920 rotates counter-clockwise. A portion of a wastegate 1950 is shown in the upper view, which may close for counter-clockwise rotation of the shaft 1920 (e.g., movement of the rod end 1984 to the right) and may open for clockwise rotation of the shaft 1920 (e.g., movement of the rod end 1984 to the left). As an example, the control rod 1980 may be operatively coupled to an actuator that may be electric, pneumatic, or otherwise powered. As an example, an actuator may be linear, rotary or linear and rotary.

Figure 13:
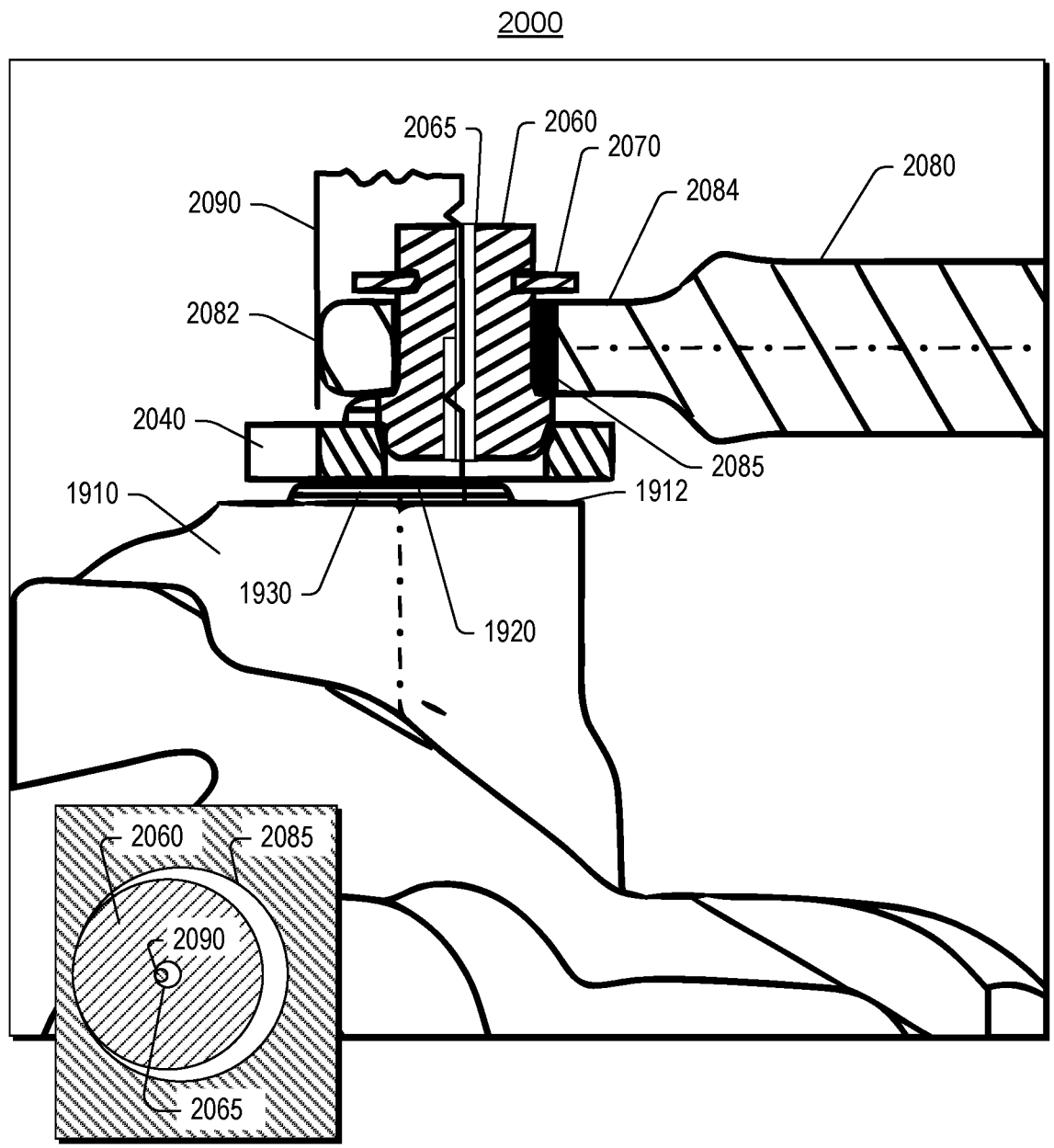
FIG. 13 is a view of an example of an assembly.

FIG. 13 shows an approximate cutaway view of an example of another assembly 2000 that includes a biasing element 2090. In the assembly 2000, a control arm 2040 is operatively coupled to the shaft 1920 and operatively coupled to a pin 2060 where the pin 2060 includes an opening 2065 (e.g., a through bore). A control rod 2080 (e.g., a control link) includes a rod end 2084 that includes an opening 2085 and a distal end 2082 (e.g., an end surface or perimeter surface, etc.). As shown, the pin 2060 extends into and through the opening 2085 of the rod end 2084 and a clip 2070 acts to secure the rod end 2084, with some amount of axial clearance.

As shown, the inner diameter of the opening 2085 is greater than an outer diameter of the pin 2060. Thus, a clearance exists between the rod end 2084 and the pin 2060, the shape thereof depending on the position of the pin 2060 with respect to the opening 2085 of the rod end 2084 of the control rod 2080. For example, in the assembly 2000, as the biasing element 2090 applies a compressive force that the shape of the clearance, in cross-section, may be crescent shaped.

In FIG. 13, an inset cross-sectional view shows the opening 2085, the pin 2060, the opening 2065 and the biasing element 2090. As shown, the biasing element 2090 is offset in the opening 2065 and the pin 2060 is offset in the opening 2085. For example, the biasing element 2090 is applying a force to the pin 2060 that causes it to contact the rod end 2084 (e.g., a surface that defines the opening 2085 of the rod end 2084). In such an example, the rod end 2084 may pivot (e.g., rotate) with respect to the pin 2060 while the pin 2060 and the rod end 2084 may remain in contact.

Figure 14:
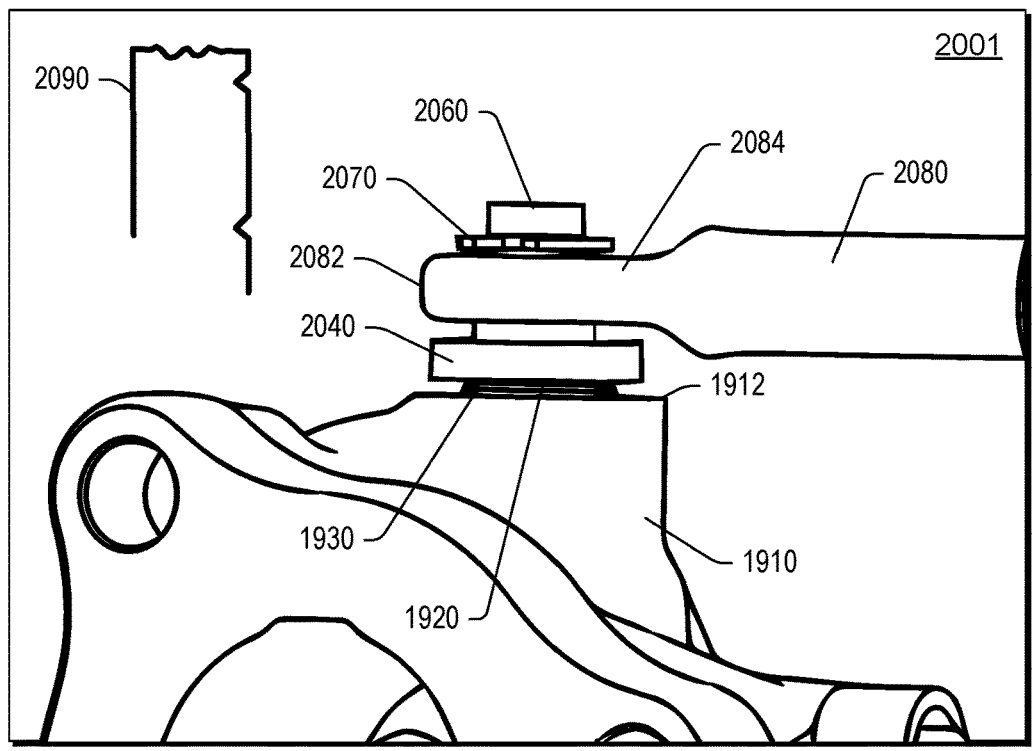
FIG. 14 is another view of the assembly of FIG. 13.
Figure 14:
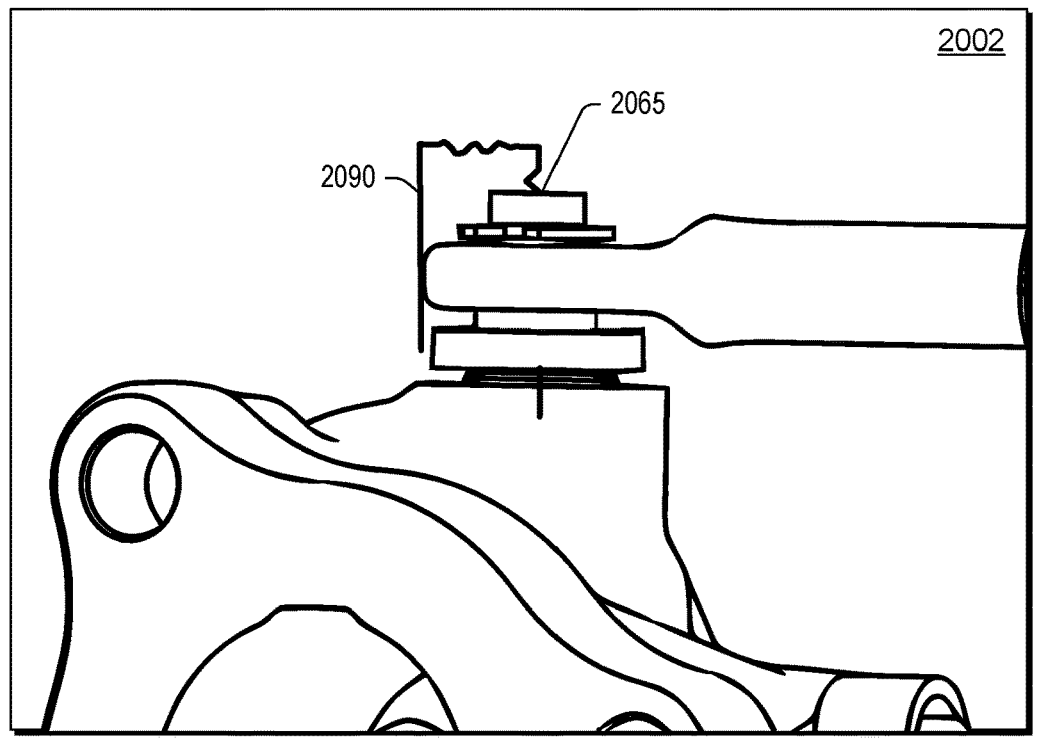

FIG. 14 shows an example of a portion of the assembly 2000 with the biasing element 2090 in an uninstalled state 2001 and in an installed state 2002. For example, a method can include installing a biasing element in a bore of a pin where a portion of the biasing element contacts a distal end (e.g., an end surface) of a rod where the biasing element applies force between a surface of the bore of the pin and the end surface of the distal end of the rod. Such a method can include operating a turbocharger and controlling a wastegate of the turbocharger via the rod where the biasing element applies force to the rod, for example, to reduce noise by maintaining contact between a surface of the pin and a surface of an opening of the rod.

Figure 15:
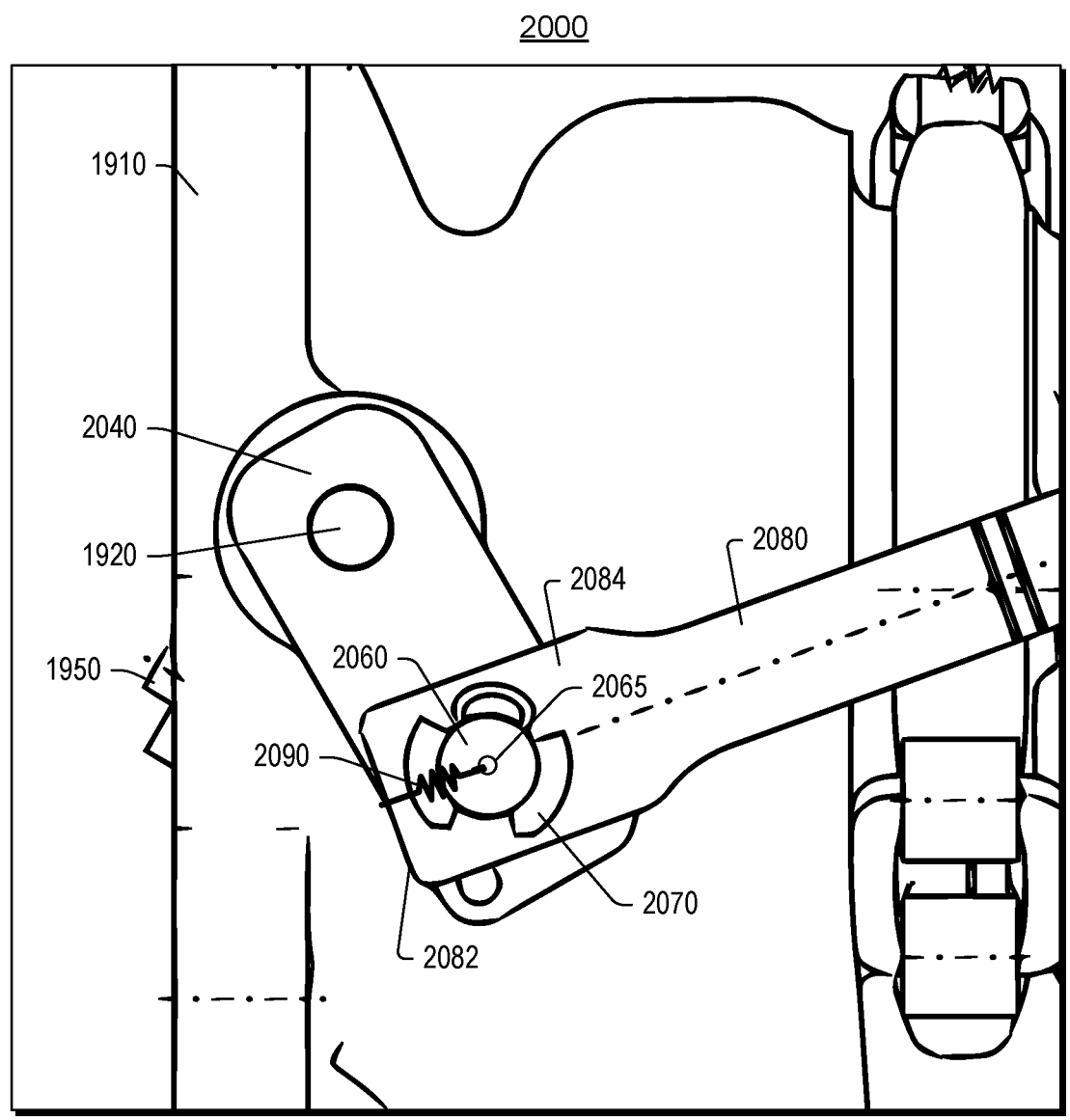
FIG. 15 is another view of the assembly of FIG. 13.
Figure 16:
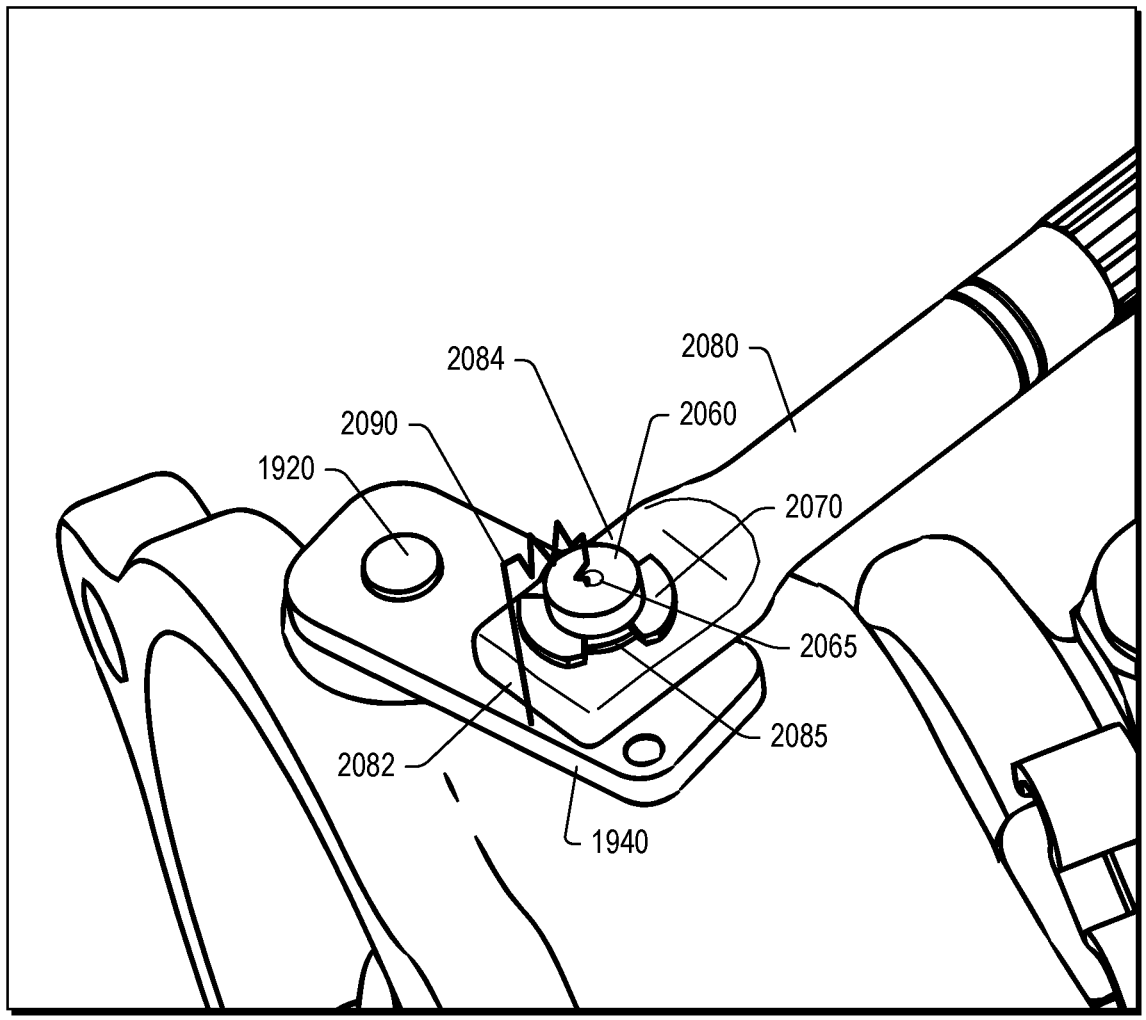
FIG. 16 is another view of the assembly of FIG. 13.

FIGS. 15 and 16 show examples of portions of the assembly 2000 with the biasing element 2090 installed. FIG. 15 shows the rod 2080 as having a longitudinal axis where the pin 2060 couples the rod 2080 to the control arm 2040, which is coupled to the shaft 1920 as disposed at least in part in a bore of the housing 1910. In the example of FIG. 15, the biasing element 2090 includes a portion that spans a distance substantially along the longitudinal axis of the rod 2080, between the opening 2065 and the end 2082 of the rod 2080. For example, the biasing element 2090 can include legs and a bridge where the legs extend away from the bridge and where one leg can be received by the opening 2065 of the pin 2060 and where the other leg can be in contact with the end 2082 of the rod 2080. In such an example, as the rod 2080 moves (e.g., to the left or to the right to orient the wastegate 1950), the biasing element 2090 can cause the pin 2060 and a surface of an opening of the rod 2080, through which the pin 2060 passes, to be in contact. Such contact may be with an amount of force that is sufficient to reduce the effect of vibrations that would otherwise cause movement and contact/non-contact that may generate noise. While contact is mentioned, a force may be applied by the biasing element 2090 where contact between the pin 2060 and a surface of an opening of the rod 2080 does not occur, yet, where movement is restricted at least in part in a direction that would cause the biasing element 2090 to expand (e.g., to stretch).

In FIG. 16, the rod 2080 is shown as optionally including knurls and/or a joint. For example, the rod 2080 may be a multi-piece rod that is optionally adjustable. For example, a method can include inserting the biasing element 2090 and adjusting an axial length of the rod 2080, for example, to tension the biasing element 2090 or to tailor an amount of tension on the biasing element 2090.

Figure 17:
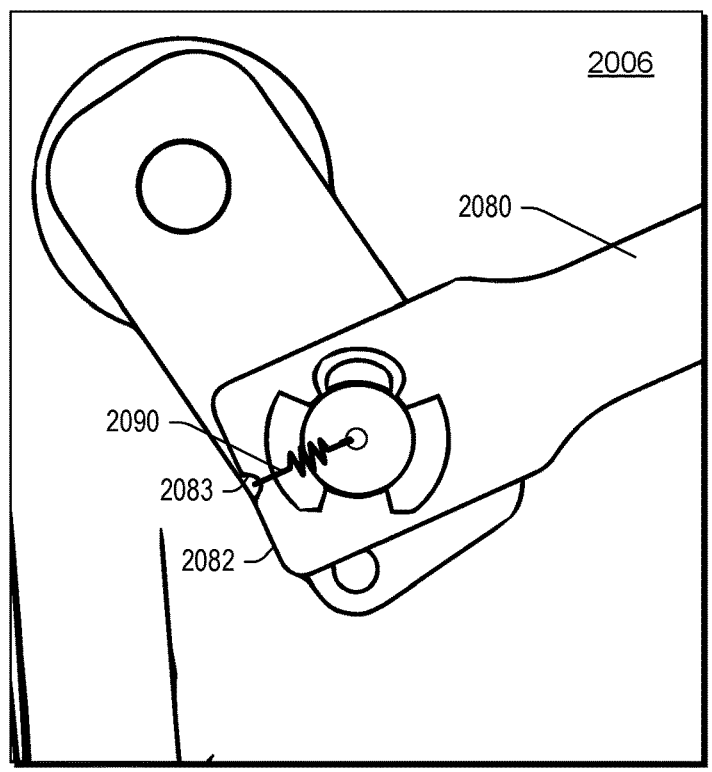
FIG. 17 is a series of views of examples of portions of assemblies.
Figure 17:
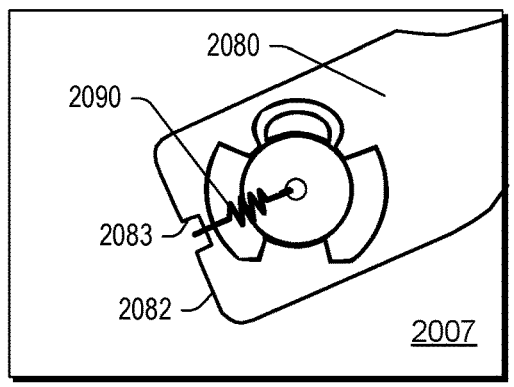
Figure 17:
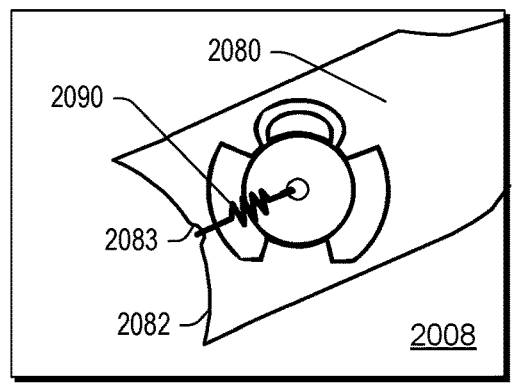
Figure 17:
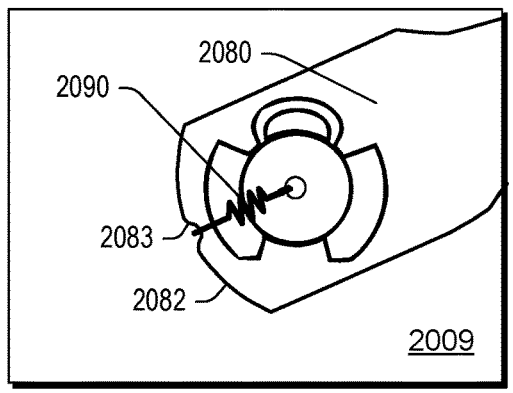

FIG. 17 shows some examples of assemblies 2006, 2007, 2008 and 2009 where rod end shapes and features can interact with the biasing element 2090 (e.g., or another type of biasing element).

In the example assembly 2006, the end 2082 of the rod 2080 includes a notch 2083 that may be curved in its profile. For example, a curved profile may allow for some displacement of a portion of the biasing element 2090 while providing a minimum displacement that is substantially centered with respect to a longitudinal axis of the rod 2080. For example, thrust forces associated with operational adjustments of the rod 2080, vibration of an internal combustion engine, vibration of a vehicle, etc., that may cause some movement of the biasing element 2090 can be mitigated via the shape of the notch 2083, which may act to return the biasing element 2090 to a more centered position with respect to the longitudinal axis of the rod 2080 (e.g., a position of lower potential energy, etc.).

In the example assembly 2007, the notch 2083 of the end 2082 of the rod 2080 has a rectangular profile. In such an example, the biasing element 2090 may be able to move along a surface of the notch 2083 with minimal risk of the biasing element 2090 exiting the notch 2083. For example, a notch depth and/or a notch width may be predetermined to allow for some amount of movement with reduced risk of a biasing element 2090 becoming displaced during operation (e.g., exiting the notch 2083).

In the example assembly 2008, a concave shaped end 2082 of the rod 2080 may allow for a displaced biasing element 2090 to return to a notch-limited position and/or to reduce risk for total displacement (e.g., loss of contact of a portion of the biasing element 2090 with the end 2082.

As to the example assembly 2009, the end 2082 is convex where the notch 2083, which may be curved and/or rectangular, is substantially aligned with the longitudinal axis of the rod 2080. In such an example, the maximum length of the rod 2080 may be adjacent to the notch 2083. For example, a rod can include a notch that is substantially aligned along a longitudinal axis of the rod where adjacent to the notch, the rod is of a maximum length. As an example, the end 2082 of the rod 2080 can meet with sides of the rod 2080 that may define corners. As an example, a notch may be of a depth that does not extend to a line drawn from corner to corner. For example, a rod can be extended in its axial length to accommodate a notch to locating a portion of a biasing element. As an example, an amount of extension in axial length of a rod may be tailored, for example, to one or more factors such as an amount of force, a size of a biasing element, etc.

As an example, an end of a rod may be concave to seat a leg of a biasing element, optionally with respect to a groove or notch. For example, a concave shape by itself may be sufficient to seat a leg of a biasing element. As an example, a concave shape of an end of a rod may act to "center" a biasing element. As an example, a rod may include a wave-like end, for example, consider two or more valleys with peaks between the valleys such that a biasing element may be seated with respect to a selected one of the valleys. In such an example, the end of the rod may be symmetric such that the orientation of the rod can be in one of two orientations (e.g., a side facing a turbine housing or that side facing away from the turbine housing). As mentioned, an end can be substantially flat (e.g., at substantially right angles with respect to sides) and can include a concave, curved groove or notch. As an example, an end can be substantially flat and can include a polygonal shaped groove or notch.

Figure 18:
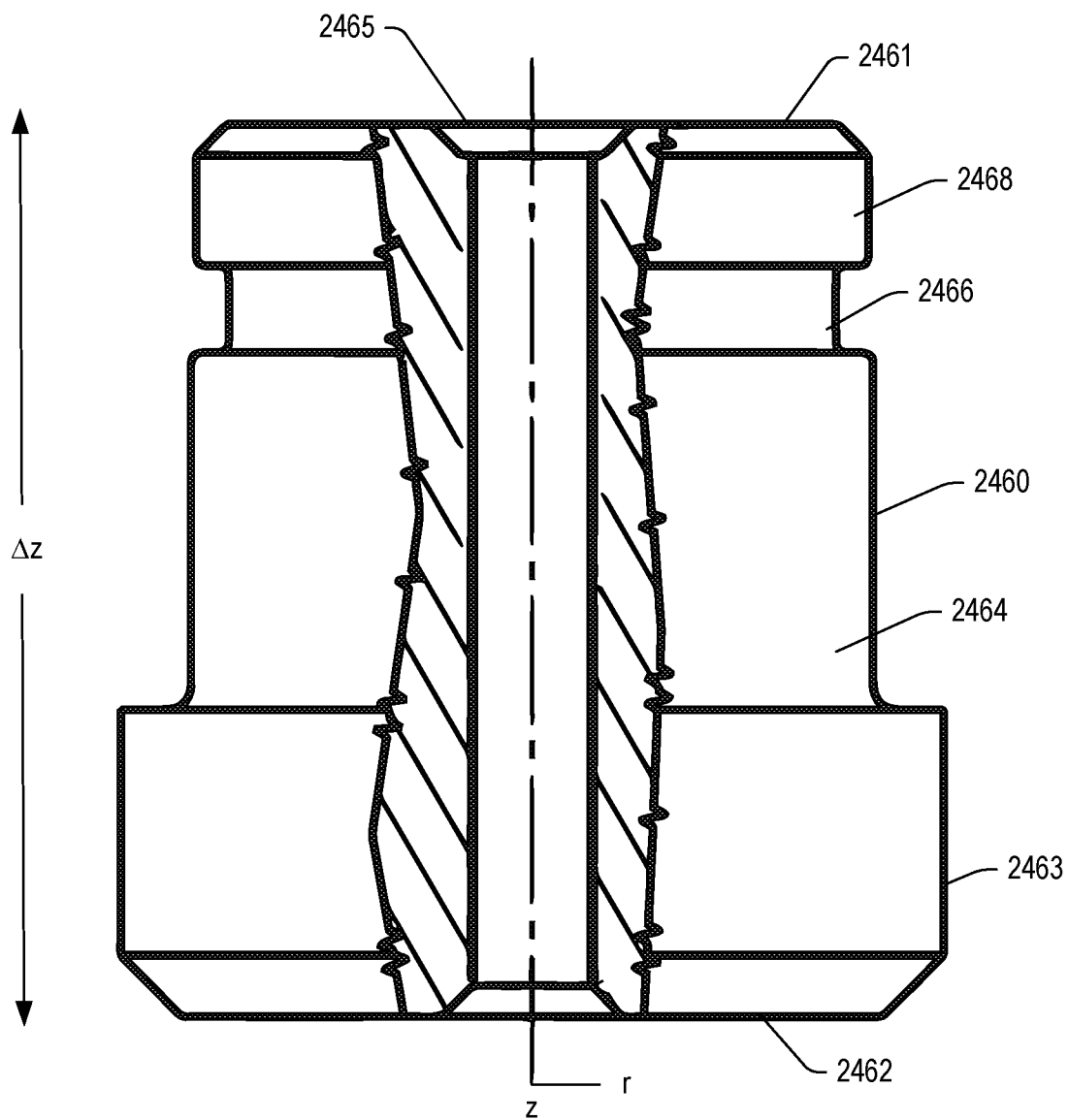
FIG. 18 is a view of an example of a pin.
Figure 19:
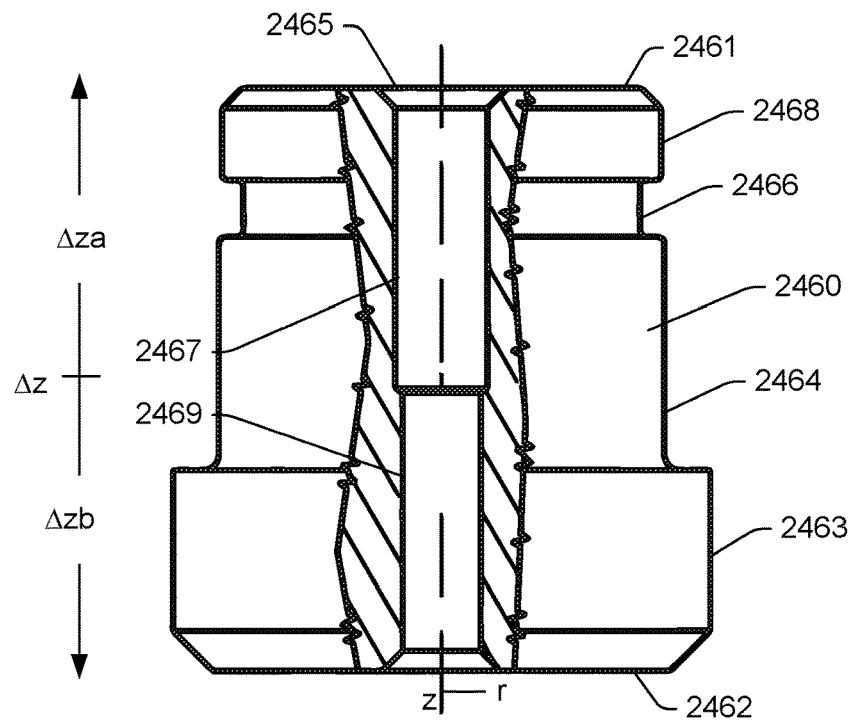
FIG. 19 is a series of views of examples of pins.
Figure 19:
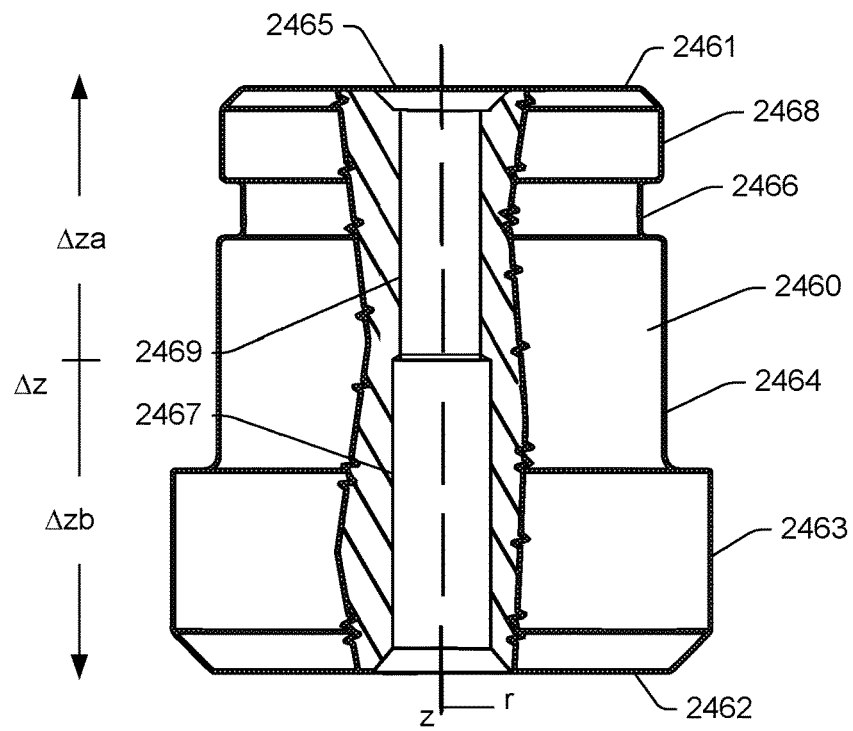

FIG. 18 shows an example of a pin 2460 that includes the opening 2465 extending to a through bore with a relatively constant diameter, optionally chamfered at its ends. FIG. 19 shows examples of the pin 2460 that include the opening 2465 extending to a stepped through bore with a larger diameter portion 2467 and a smaller diameter portion 2469. As shown, the larger diameter portion 2467 may extend from a shoulder or step in a stepped through bore toward one end surface 2461 or another, opposing end surface 2462.

Various features in FIGS. 18 and 19 may be described with respect to a coordinate system such as, for example, a cylindrical coordinate system that includes at least a radial coordinate (r) and an axial coordinate (z).

In the examples of FIGS. 18 and 19, the pin 2460 is shown as including the end surface 2461 (e.g., an axial face), the opposing end surface 2462 (e.g., an axial face), a largest diameter surface 2463 that steps at a shoulder to a smaller diameter surface 2464 that steps at a shoulder to an smallest diameter surface 2466 (e.g., of an annular groove) that steps at a shoulder to another surface 2468 that extends to the end surface 2461, optionally via a beveled edge. As an example, the surface 2466 may receive a retaining component (e.g., a C-clip, etc.). As an example, the shoulder between the surfaces 2463 and 2464 may act at least in part to seat a surface of a rod end. As an example, the surface 2463 may be disposed at least in part in an opening of a control arm. As an example, an axial dimension $\Delta z$ may be defined as a length of the through bore in the pin 2460. As an example, an axial dimension $\Delta za$ may define an axial dimension of the portion 2467 of the through bore and an axial dimension $\Delta zb$ may define an axial dimension of the portion 2469 of the through bore of the pin 2460 (e.g., or vice versa).

As an example, a biasing element can include a leg that extends into the through bore of the pin 2460 where the leg contacts a surface or surfaces of the through bore.

As an example, a leg of a biasing element can include a flexible portion that has a free standing dimension that exceeds a diameter of a through bore of a pin. In such an example, a portion of the leg may be inserted into and through the through bore where the flexible portion changes shape within the through bore for passage therethrough. Once the flexible portion reaches the end of the through bore, it may "expand" to its free standing shape where the free standing dimension causes the leg to be secured, unless a certain level of force is applied to deform the free standing shape and pull it back into the through bore.

As an example, a through bore of a pin may include a notch or groove that can receive a portion of a biasing element. However, in such an arrangement, where the pin is fixed to a component, rotation of that component and hence the pin may cause force to be applied to the biasing element. Depending on the arrangement of components, how forces are applied, etc., such force may be beneficial.

Where a biasing element is "freely" coupled to a pin, it may rotate or move independently of the pin. For example, in such an arrangement, a biasing element may be substantially free of torque, rotational forces, etc., as may occur when a control link (e.g., a control rod) is moved. In such an example, the biasing element may apply a compression force that is between axial legs of the biasing element where one of the legs is disposed in a through bore of a pin and another one of the legs is in contact with an end of a control link (e.g., in contact with an end surface of a rod end of a control rod, etc.).

Figure 20:
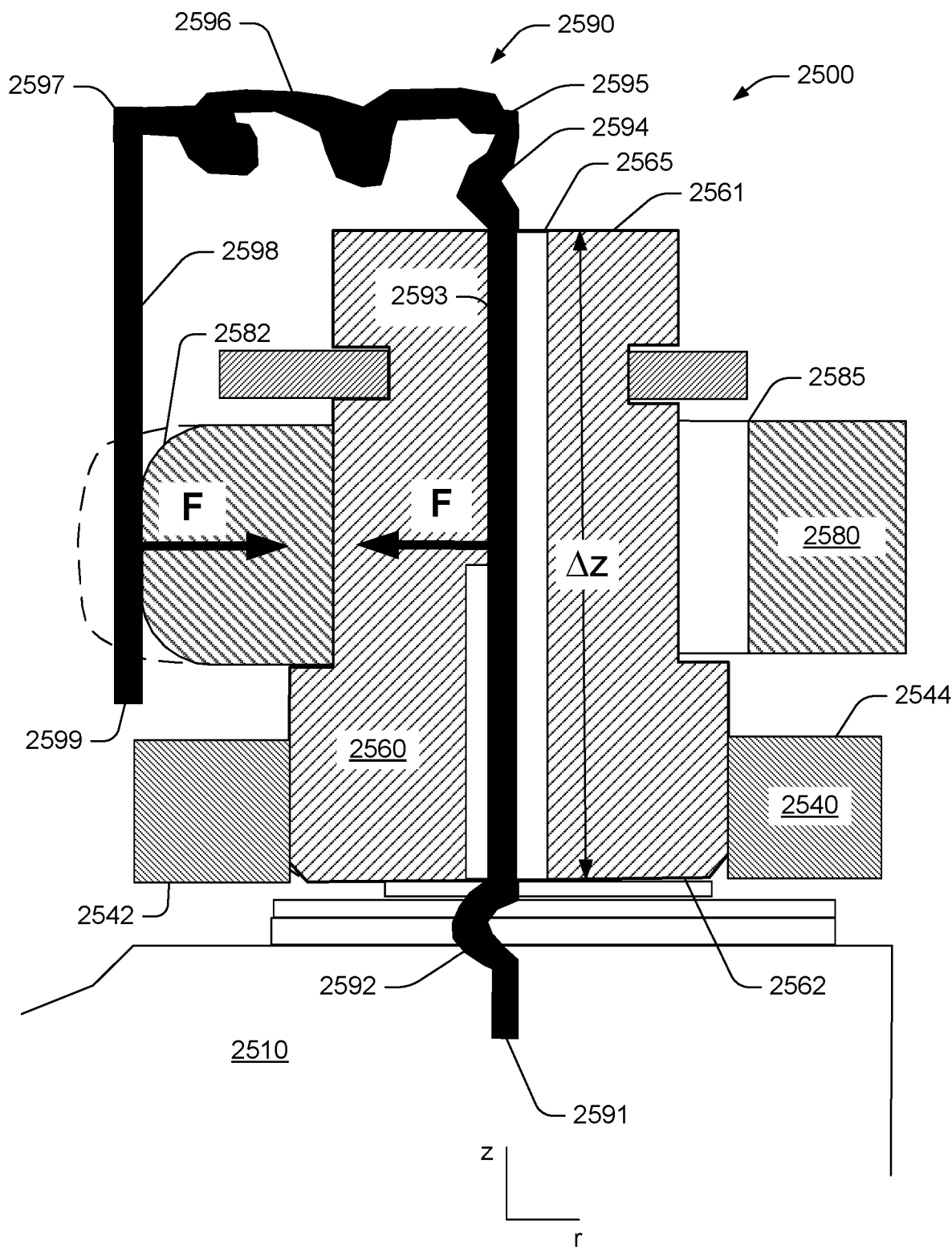
FIG. 20 is a view of an example of an assembly.

FIG. 20 shows an example of a portion of an assembly 2500. In the example of FIG. 20, a pin 2560 includes opposing ends 2561 and 2562 and a bore that extends from the end 2561 to the end 2562 where the bore has a length Δz. In the example of FIG. 20, the bore can include one or more features that may aid in locating, positioning, etc., a biasing element 2590.

As shown in FIG. 20, the pin 2560 is received by an opening 2585 in a control link 2580 (e.g., a rod) that includes an end surface 2582. In the cross-sectional view of FIG. 20, the portion of the end surface 2582 that contacts the biasing element 2590 may correspond to a notch surface. For example, in a cross-section moving into the page and/or out of the page, the end of the control link 2580 can extend to the left and optionally beyond the thickness of the biasing element 2590 (see, e.g., dashed lines and examples assemblies 2006, 2007, 2008 and 2009 of FIG. 17).

In the example of FIG. 20, the control link 2580 is disposed an axial distance (see, e.g., direction of Δz) above a control arm 2540 that includes a lower surface 2542 and an upper surface 2544 (e.g., outwardly facing surface that faces away from an outer surface of a turbine housing 2510).

In the example of FIG. 20, the biasing element 2590 is provided as an example of a biasing element. As shown, the biasing element 2590 includes ends 2591 and 2599 where, for example, the end 2591 may be an end of a first axial leg of the biasing element 2590 and the end 2599 may be an end of a second axial leg of the biasing element 2590 where the first axial leg and the second axial leg may optionally be substantially parallel to each other (e.g., in the installed state of the biasing element 2590 as shown in the example of FIG. 20). As an example, the legs may apply compressive forces, for example, as shown by arrows and labels "F". For example, a leg of the biasing element 2590 may contact the end surface 2582 (e.g., optionally in a notch, etc.) and another leg of the biasing element 2590 may contact a surface that defines at least a portion of the bore of the pin 2560. These legs, via their respective contacts, can apply compressive forces that act to draw the pin 2560 towards the end surface 2582 of the control link 2580 and that act to draw the end surface 2582 of the control link 2580 towards the pin 2560. For example, without the biasing element 2590, the control link 2580 may be movable in a direction orthogonal to a z-axis of the pin 2560 where the amount of movement may correspond to a difference (e.g., a clearance) in dimensions of the portion of the pin 2560, as received within the opening 2585, and the opening 2585.

As shown in the example of FIG. 20, where the through bore of the pin 2560 is substantially perpendicular to a plane, where the opening 2585 may be defined to have a cross-section in that plane (e.g., in r and Θ of a cylindrical coordinate system r, z, Θ), a clearance can exist in that plane between the control link 2850 and/or the pin 2560 (see, e.g., the assembly of FIG. 13). In absence of the biasing element 2590, during operation, movement of the control link 2580 (e.g., due to actuation, vibration, etc.) may occur within that clearance and contact may occur between the control link 2580 and a wall of the pin 2560 that defines the through bore. Such contact may generate noise and may cause wear and/or, for example, some amount of control uncertainty (e.g., consider a feedback mechanism that may be required to handle or filter out such free motion, contact, vibration, etc.).

In the example of FIG. 20, the biasing element 2590 is shown as including a retention feature 2592, a positioning feature 2594, a shoulder or bend 2595, a coil 2596 (e.g., of one or more loops), and a shoulder or bend 2597. As an example, a leg may be defined as a section of the biasing element 2590 disposed between the features 2592 and 2594 and a leg may be defined as a section of the biasing element 2590 disposed between the end 2599 and the shoulder or bend 2597.

Figure 21:
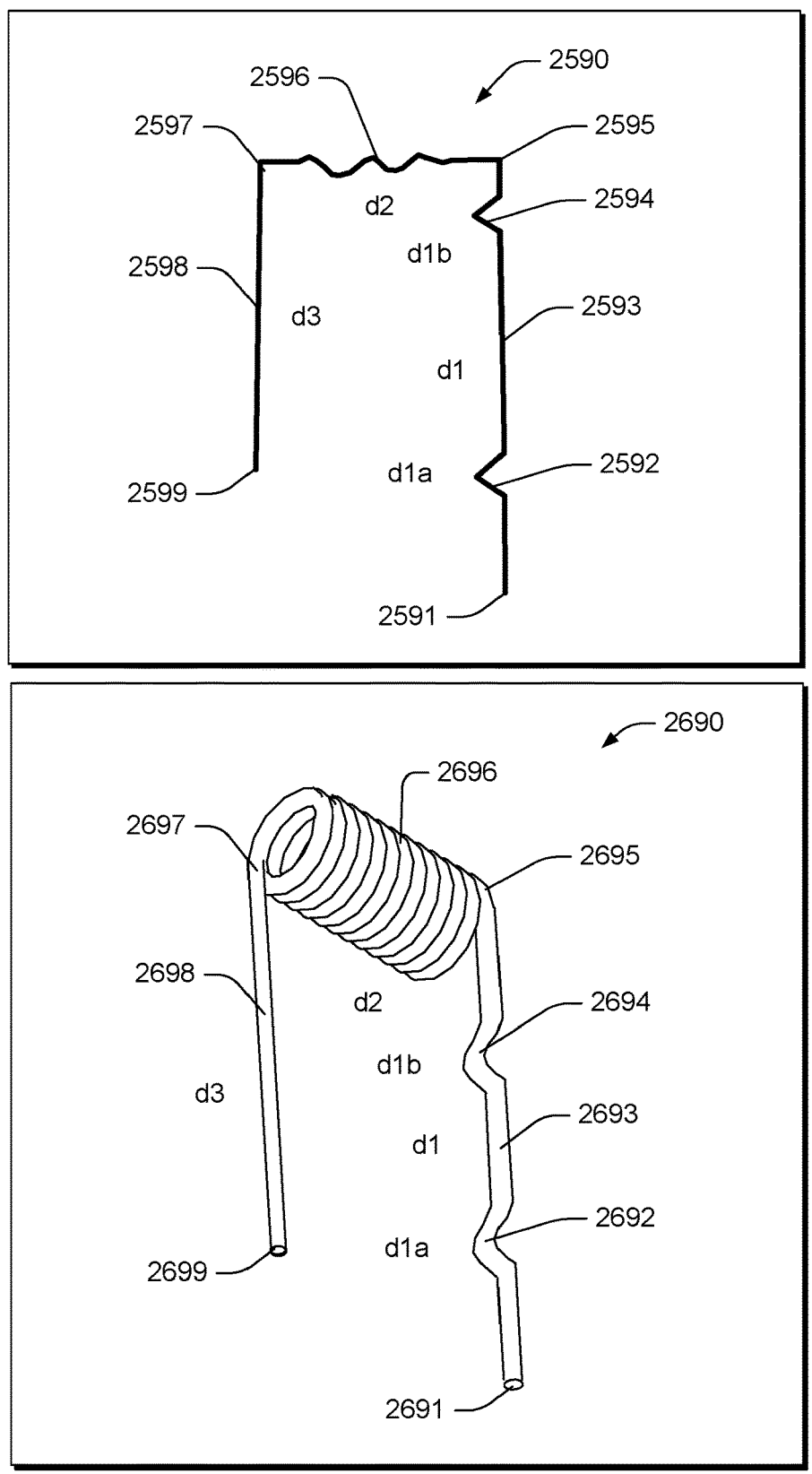
FIG. 21 is a series of views of examples of biasing elements.

FIG. 21 shows a schematic view of the biasing element 2590, which may optionally be configured, for example, as an example biasing element 2690, which is shown in a perspective view in FIG. 21.

Various dimensions are shown in FIG. 21, including d1, d2, d3, d1a and d1b. As an example, d1 may be an axial leg dimension d2 may be a cross-member dimension and d3 may be an axial leg dimension, for example, disposed a distance from another axial leg by the cross-member dimension d2. As an example, the dimension d1a may be a dimension or a position of a feature that may act to secure a biasing element. As an example, the dimension d1b may be a dimension or a position of a feature that may act to locate a biasing element.

In FIG. 21, the biasing element 2690 includes ends 2691 and 2699, a leg 2693 and a leg 2698, a coil spring 2696 with ends 2695 and 2697 and features 2692 and 2694. As an example, the feature 2694 may act to limit axial movement of the leg 2693 with respect to a bore of a pin (e.g., a peg, etc.). As an example, the feature 2692 may act to limit axial movement of the leg 2693 with respect to a bore of a pin (e.g., a peg, etc.).

As an example, the coil spring 2696 may be characterized at least in part by a spring constant. As an example, the coil spring 2696 may apply a compressive force that acts to draw the legs 2693 and 2698 towards each other or, for example, that resists moving the legs 2693 and 2698 away from each other.

Figure 22:
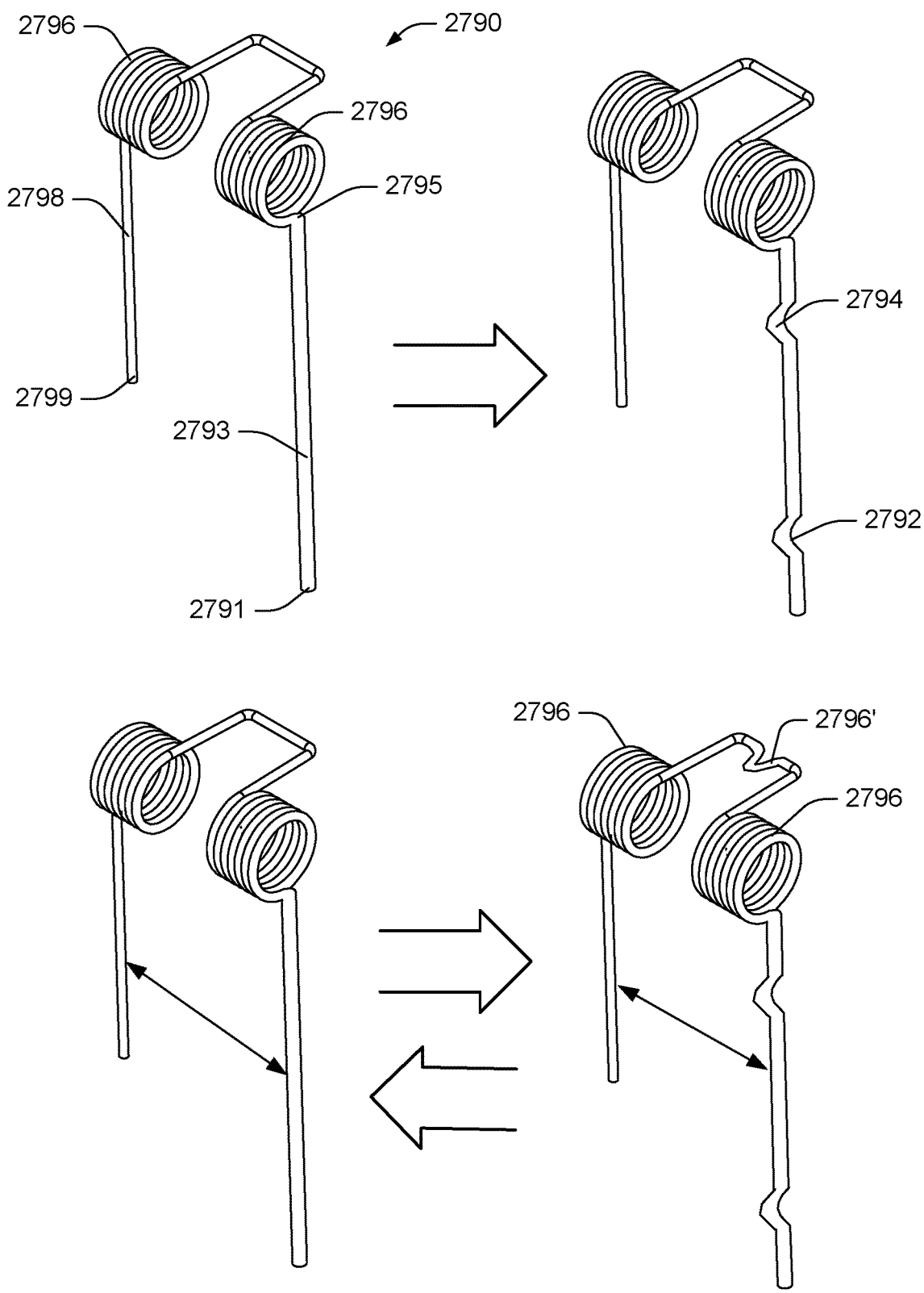
FIG. 22 is a series of views of examples of biasing elements.

FIG. 22 shows an example of a biasing element 2790 that can include a plurality of coil springs 2796. As an example, a member may be disposed between two coil springs where the member may optionally be deformed as illustrated in the lower right view (see, e.g., the deformed portion 2796').

In FIG. 22, the biasing element 2790 can include ends 2791 and 2799, legs 2793 and 2798, one or more junctures 2795 (e.g., leg to spring junctures), features 2792 and 2794 (e.g., for locating and/or securing, etc.).

As an example, a biasing element may optionally be positioned and then crimped, bent, deformed, etc. For example, FIG. 22 shows examples of the leg 2793 without the features 2792 and 2794 and with such features. As an example, such features may be formed during an installation process. For example, the feature 2794 may be formed, the leg 2793 inserted in a bore of a pin (e.g., a peg, etc.) and then the feature 2792 may be formed. As an example, pliers or another type of tool may be used to form such features. As an example, where a force or spacing of a spring element or elements is to be adjusted, a tool may be utilized to make such an adjustment (see, e.g., the deformed portion 2796'). As an example, a portion of a biasing element may be deformed or otherwise adjusted to increase or decrease spacing between two legs. As an example, a biasing element may be provided with an expandably deformable portion and/or a contractably deformable portion.

As an example, a biasing element may be fit and then bent or otherwise shaped after fitting. As an example, a biasing element may be replaceable. For example, consider fitting a biasing element and then removing the biasing element for inspection, servicing and/or replacement. As an example, a method can include fitting a biasing element to a pin and a rod and optionally shaping the biasing element via use of a tool or tools. In such an example, where the biasing element is shaped, a tool or tools may be used to re-shape the biasing element, optionally to make an adjustment (e.g., as to force), to remove the biasing element, etc.

As an example, an assembly can include a turbine housing that includes a bore, a wastegate seat and a wastegate passage that extends to the wastegate seat; a bushing disposed at least in part in the bore; a rotatable wastegate shaft received at least in part by the bushing; a wastegate plug that extends from the wastegate shaft; a control arm operatively coupled to the wastegate shaft; a control link operatively coupled to the control arm; a pin that forms a joint between the control arm and the control link; and a biasing element coupled to the pin and to the control link. As an example, such an assembly can include an actuator operatively coupled to the control link.

As an example, a pin can include an opening, for example, where a portion of the biasing element is disposed in the opening. In such an example, the pin can include a bore where the opening is a bore opening. As an example, a pin can include a through bore, which may be, for example, a stepped through bore.

As an example, a biasing element can include legs. For example, consider a biasing element where a first one of the legs defines a first leg axis and where a second one of the legs defines a second leg axis. In such an example, the first leg axis can be substantially parallel to the second leg axis (e.g., within about 20 degrees or less). As an example, parallel legs may act to direct forces in a direction substantially perpendicular to the legs. For example, a compressive force may draw the legs together over a distance where the legs move in a substantially parallel manner.

As an example, a biasing element can include at least one coil spring. As an example, a biasing element can include eat least one coil spring disposed between two legs. As an example, a biasing element can include be or include a spring.

As an example, a control link can include an end surface where, for example, a pin includes a bore and where, for example, a biasing element contacts a surface of the bore and contacts the end surface of the control link. In such an example, the biasing element can bias the pin in an opening in the control link, for example, the pin can contact a surface that defines the opening in the control link.

As an example, a control link can include a groove that receives a portion of the biasing element. As an example, the groove may be in an end surface of the control link. As an example, a groove may orient a portion of a biasing element with respect to another portion of the biasing element that is received in a bore of a pin. In such an example, the portion of the biasing element that is received in the bore of the pin can be rotatable in the bore. As an example, movement of a control link may cause rotation of a portion of a biasing element in a bore of a pin (e.g., where another portion is oriented with respect to an end of the control link).

As an example, a turbocharger can include a compressor assembly; a center housing assembly; a turbine assembly that includes a control arm that controls position of a wastegate plug with respect to a wastegate seat; a control link operatively coupled to the control arm; an actuator operatively coupled to the control link; a pin that forms a joint between the control arm and the control link; and a biasing element coupled to the pin and to the control link.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:
   a turbine housing that comprises a bore, a wastegate seat and a wastegate passage that extends to the wastegate seat;
   a bushing disposed at least in part in the bore;
   a rotatable wastegate shaft received at least in part by the bushing;
   a wastegate plug that extends from the wastegate shaft;
   a control arm operatively coupled to the wastegate shaft;
   a control link operatively coupled to the control arm;
   a pin that forms a joint between the control arm and the control link; and
   a biasing element wherein the biasing element comprises legs that apply a compression force therebetween wherein one of the legs is disposed in an opening of the pin and another one of the legs is in contact with an end surface of the control link.

2. The assembly of claim 1 comprising an actuator operatively coupled to the control link.

3. The assembly of claim 1 wherein the opening of the pin is a bore opening of the pin.

4. The assembly of claim 1 wherein the opening of the pin comprises a through bore.

5. The assembly of claim 4 wherein the through bore comprises a stepped through bore.

6. The assembly of claim 1 wherein the leg disposed in the opening of the pin defines a first leg axis and wherein the leg in contact with the end surface of the control link defines a second leg axis.

7. The assembly of claim 6 wherein the first leg axis is substantially parallel to the second leg axis.

8. The assembly of claim 1 wherein the biasing element comprises at least one coil spring.

9. The assembly of claim 1 wherein the biasing element comprises at least one coil spring disposed between the legs that apply the compression force therebetween.

10. The assembly of claim 1 wherein the opening of the pin comprises a bore and wherein the biasing element contacts a surface of the bore.

11. The assembly of claim 10 wherein the biasing element biases the pin in an opening in the control link.

12. The assembly of claim 11 wherein the pin contacts a surface that defines the opening in the control link.

13. The assembly of claim 1 wherein the biasing element comprises a spring.

14. The assembly of claim 1 wherein the end surface of the control link comprises a grove that receives the another one of the legs of the biasing element.

15. The assembly of claim 14 wherein the groove orients the another one of the legs of the biasing element with respect to the one of the legs of the biasing element that is received in the opening of the pin.

16. The assembly of claim 15 wherein the one of the legs of the biasing element that is received in the opening of the pin is rotatable in the opening.

17. The assembly of claim 16 wherein movement of the control link rotates the one of the legs of the biasing element in the opening of the pin.

18. A turbocharger comprising:
a compressor assembly;
a center housing assembly;
a turbine assembly that comprises a control arm that controls position of a wastegate plug with respect to a wastegate seat;
a control link operatively coupled to the control arm;
an actuator operatively coupled to the control link;
a pin that forms a joint between the control arm and the control link; and
a biasing element wherein the biasing element comprises legs that apply a compression force therebetween wherein one of the legs is disposed in an opening of the pin and another one of the legs is in contact with an end surface of the control link.

* * * * *